United States Patent
Sanjo et al.

(10) Patent No.: US 9,897,803 B2
(45) Date of Patent: Feb. 20, 2018

(54) ZOOM LENS AND IMAGE PICKUP APPARATUS INCLUDING THE SAME

(71) Applicant: CANON KABUSHIKI KAISHA, Tokyo (JP)

(72) Inventors: Yotaro Sanjo, Utsunomiya (JP); Tomoya Yamada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 14/977,890

(22) Filed: Dec. 22, 2015

(65) Prior Publication Data

US 2016/0187628 A1     Jun. 30, 2016

(30) Foreign Application Priority Data

Dec. 26, 2014  (JP) .................................. 2014-264716

(51) Int. Cl.

| | | |
|---|---|---|
| *G02B 15/02* | (2006.01) | |
| *G02B 27/00* | (2006.01) | |
| *G02B 15/10* | (2006.01) | |
| *G02B 15/173* | (2006.01) | |

(52) U.S. Cl.
CPC ......... *G02B 27/0025* (2013.01); *G02B 15/10* (2013.01); *G02B 15/173* (2013.01)

(58) Field of Classification Search
CPC ........ G02B 15/10; G02B 15/02; G02B 15/14; G02B 15/173
See application file for complete search history.

(56) References Cited

U.S. PATENT DOCUMENTS

| | | | | |
|---|---|---|---|---|
| 6,639,737 | B2 * | 10/2003 | Yasui ................. | G02B 13/16 359/658 |
| 9,291,800 | B2 | 3/2016 | Inomoto et al. | |
| 2005/0122595 | A1 * | 6/2005 | Nurishi ................. | G02B 15/17 359/684 |
| 2010/0208358 | A1 * | 8/2010 | Minefuji ................. | G02B 13/16 359/682 |
| 2011/0157429 | A1 * | 6/2011 | Matsunaga .......... | G02B 15/173 348/240.3 |

(Continued)

FOREIGN PATENT DOCUMENTS

| | | |
|---|---|---|
| JP | 3031598 B2 | 4/2000 |
| JP | 2005-292605 A | 10/2005 |
| JP | 5049751 B2 | 10/2012 |

*Primary Examiner* — Bumsuk Won
*Assistant Examiner* — Tamara Y Washington
(74) *Attorney, Agent, or Firm* — Carter, DeLuca, Farrell & Schmidt, LLP

(57) ABSTRACT

Provided is a zoom lens having a wide angle of field, a high zoom ratio, and high optical performance over the entire zoom range, and being small in size and lightweight. The zoom lens includes, in order from an object side to an image side: a first positive lens unit; a second negative lens unit; a third positive lens unit; a fourth positive lens unit; and at least one rear lens unit, in which: the first lens unit is configured not to move for zooming; the second lens unit, the third lens unit, and the fourth lens unit are configured to move while changing an interval between each pair of adjacent lens units during zooming; and the third lens unit (U3) is configured to move from the object side toward the image side during focusing from an object at infinity to an object at close distance.

20 Claims, 16 Drawing Sheets

(56) References Cited

U.S. PATENT DOCUMENTS

| | | | |
|---|---|---|---|
| 2013/0229565 A1* | 9/2013 | Hatakeyama | G02B 15/173 348/345 |
| 2014/0029112 A1* | 1/2014 | Sanjo | G02B 15/14 359/687 |
| 2015/0015745 A1* | 1/2015 | Miyajima | G02B 15/16 348/240.1 |
| 2015/0092281 A1* | 4/2015 | Aoi | G02B 15/173 359/687 |
| 2015/0146045 A1* | 5/2015 | Ito | H04N 5/23296 348/240.3 |
| 2015/0316754 A1 | 11/2015 | Sanjo | |
| 2015/0316756 A1 | 11/2015 | Sanjo | |
| 2016/0116721 A1* | 4/2016 | Ogata | G02B 27/64 359/684 |
| 2016/0124199 A1 | 5/2016 | Sanjo et al. | |

\* cited by examiner

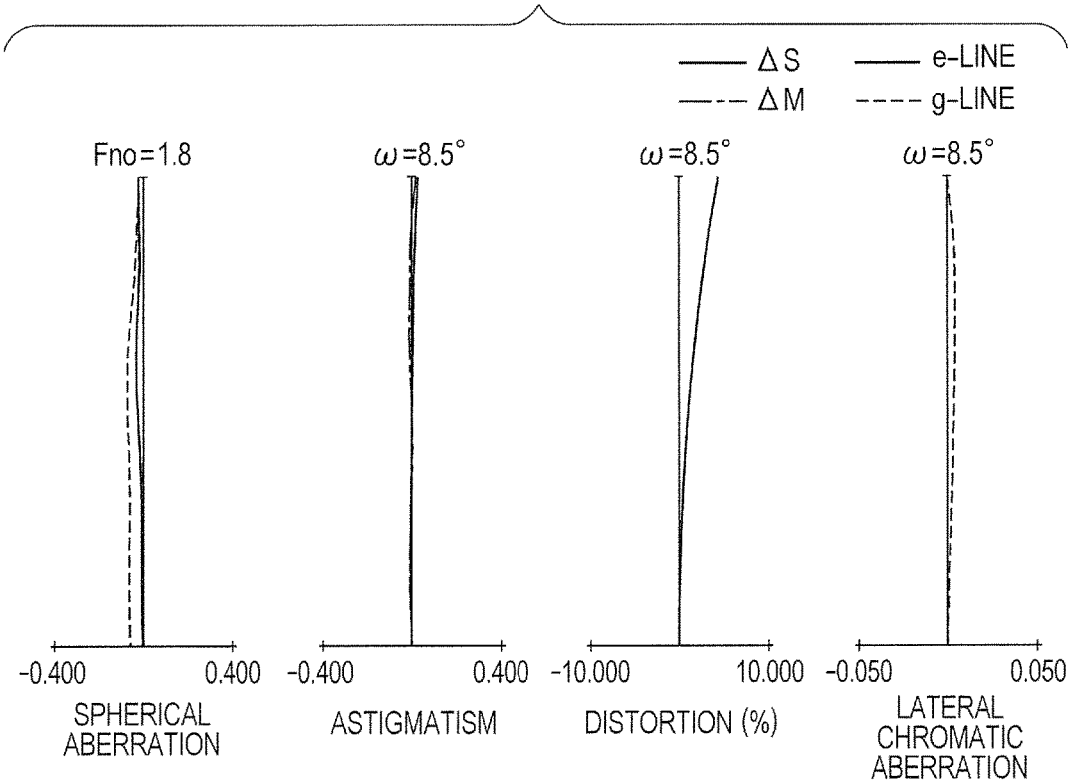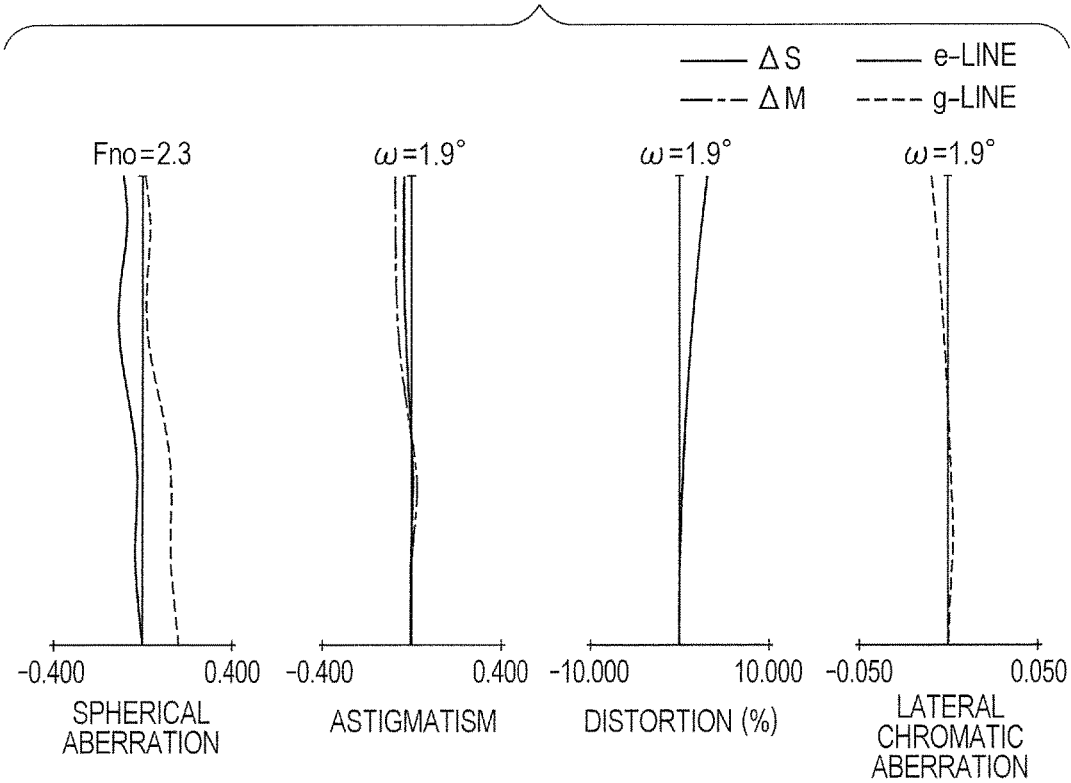

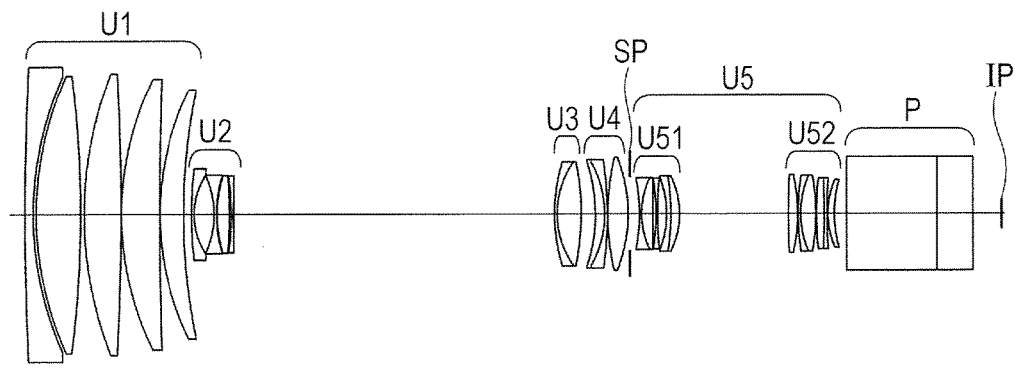
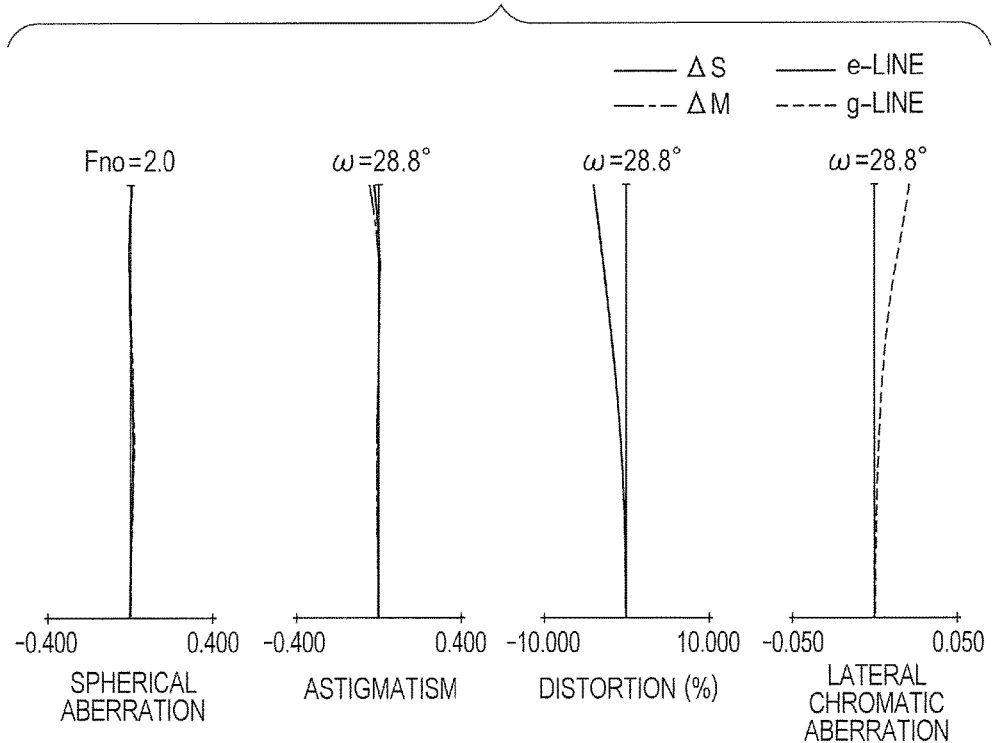

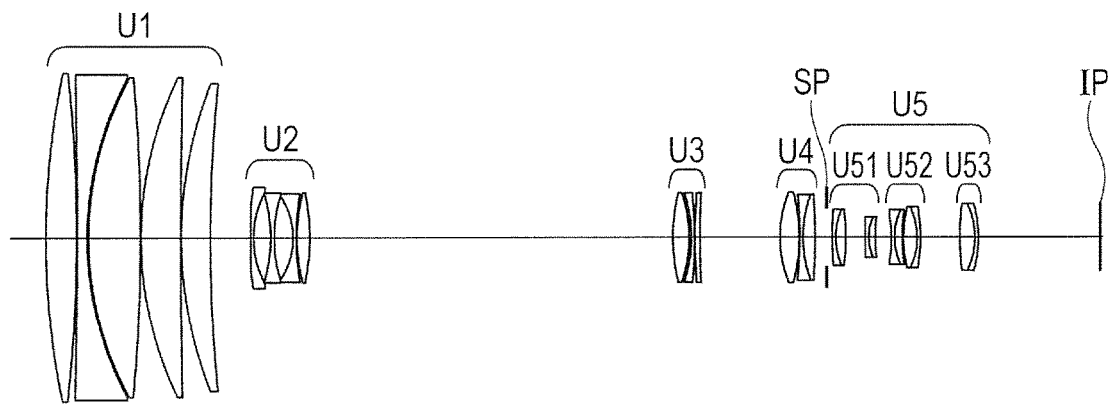
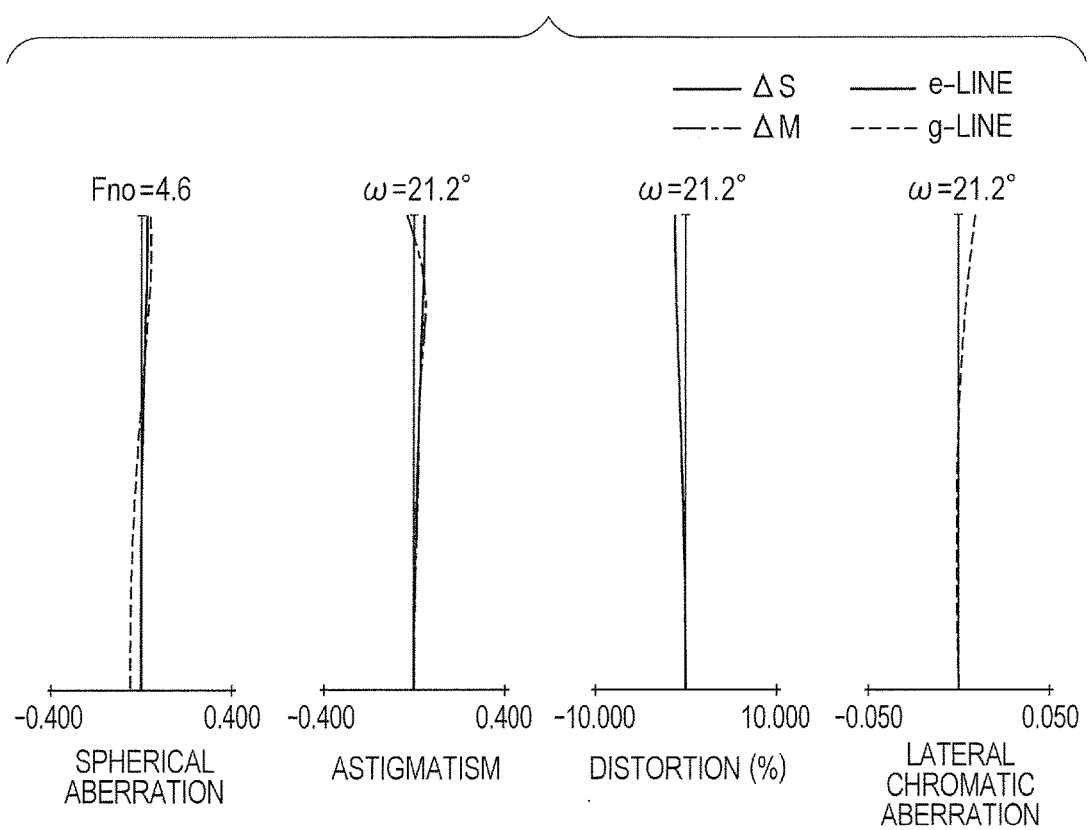

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are particularly suitable for use in a broadcasting television camera, a cinema camera, a video camera, a digital still camera, and a silver-halide film camera.

Description of the Related Art

In recent years, as a zoom lens mounted on an image pickup apparatus such as a television camera, a cinema camera, a video camera, or a picture camera, a zoom lens having a wide angle of field and a high zoom ratio, being small in size and lightweight, and having high optical performance has been sought for. As the zoom lens having the wide angle of field and the high zoom ratio, there has been known a positive-lead type zoom lens including four or five lens units, in which a lens unit having a positive refractive power, which is configured not to move during zooming, is arranged closest to an object side as disclosed in Japanese Patent No. 3031598 and Japanese Patent No. 5049751, and as described in Japanese Patent Application Laid-Open No. 2005-292605.

In each of Japanese Patent No. 3031598 and Japanese Patent No. 5049751, a zoom lens including, in order from an object side to an image side, first to fifth lens units having positive, negative, positive, positive, and positive refractive powers, in which the first lens unit is used to perform focus adjustment, is disclosed.

In Japanese Patent Application Laid-Open No. 2005-292605, a zoom lens including, in order from an object side to an image side, a first lens unit having a positive refractive power, a second lens unit having a negative refractive power, a third lens unit having a negative refractive power, and a fourth lens unit having a positive refractive power, in which a part of the fourth lens unit is used to perform focus adjustment, is described. In other words, in Japanese Patent Application Laid-Open No. 2005-292605, a zoom lens of a so-called rear focus type, in which a lens unit other than the first lens unit is used to perform the focus adjustment, is described.

In the above-mentioned positive-lead type zoom lens, in order to attain the wide angle of field, the high zoom ratio, reductions in size and weight, and the high optical performance, realizing both reductions in size and weight of the first lens unit, in particular, and suppression of aberration variations caused by the focus adjustment is a problem. In order to realize both the reductions and the suppression, it is important to appropriately set paraxial arrangements of the respective lens units, and to appropriately set which one of the lens units is used to perform the focus adjustment.

In the four-unit zoom lens for a television camera in the related art, in a case where the reductions in size and weight are to be attained while having the wide angle of field and the high zoom ratio, powers of the respective lens units need to be increased, which leads to a problem in that variations in various aberrations are disadvantageously increased during zooming and the focus adjustment.

In the case where the reductions in size and weight of the first lens unit are to be attained, in particular, there is a need to reduce the number of lenses of the first lens unit, or to increase the power of the first lens unit, and hence it has been difficult to suppress the variations in various aberrations caused by the zooming and the focus adjustment.

In Japanese Patent No. 3031598 and Japanese Patent No. 5049751, when zooming is performed from a wide angle end to a telephoto end, the paraxial arrangements and movement loci of the third lens unit and the fourth lens unit are defined to satisfactorily correct optical performance at an intermediate zoom position. However, a method in which a whole or a part of the first lens unit, which has a large lens diameter, is extended is adopted, and a focus lens unit includes a large number of lenses, with the result that the reductions in size and weight of the first lens unit are not attained.

On the other hand, in Japanese Patent Application Laid-Open No. 2005-292605, the rear focus type is adopted to attain the reductions in size and weight of the first lens unit. However, in a four- or five-unit zoom lens in which lens units on the image side of an aperture stop are configured not to move during zooming, which is often adopted in a broadcasting zoom lens, a focal length conversion optical system is generally arranged in a detachable state in an imaging lens unit, which is closest to the image side. Therefore, when the rear focus type is adopted, there is a problem in that an extension amount caused by the focus adjustment on a telephoto side and at an object distance on a close range side is disadvantageously increased when the focal length conversion optical system is attached.

It is an object of the present invention to provide a zoom lens having a wide angle of field, a high zoom ratio, and high optical performance over the entire zoom range, and being small in size and lightweight.

SUMMARY OF THE INVENTION

According to one embodiment of the present invention, there is provided a zoom lens, including, in order from an object side to an image side: a first lens unit having a positive refractive power; a second lens unit having a negative refractive power; a third lens unit having a positive refractive power; a fourth lens unit having a positive refractive power; and at least one rear lens unit, in which: the first lens unit is configured not to move for zooming; the second lens unit, the third lens unit, and the fourth lens unit are configured to move while changing an interval between each pair of adjacent lens units during zooming; and the third lens unit is configured to move from the object side toward the image side during focusing from an object at infinity to an object at close distance.

Further features of the present invention will become apparent from the following description of exemplary embodiments with reference to the attached drawings.

BRIEF DESCRIPTION OF THE DRAWINGS

FIG. 2B is a longitudinal aberration diagram of the zoom lens according to Numerical Example 1 at the object distance of infinity and at an intermediate zoom position having a focal length of 36.63 mm.

FIG. 2C is a longitudinal aberration diagram of the zoom lens according to Numerical Example 1 at the object distance of infinity and at a telephoto end.

FIG. 7 is a lens cross-sectional view of a zoom lens according to Numerical Example 4 of the present invention when focusing on an object at infinity at a wide angle end.

FIG. 8A is a longitudinal aberration diagram of the zoom lens according to Numerical Example 4 at an object distance of infinity and at the wide angle end.

FIG. 11 is a lens cross-sectional view of a zoom lens according to Numerical Example 6 of the present invention when focusing on an object at infinity at a wide angle end.

FIG. 12A is a longitudinal aberration diagram of the zoom lens according to Numerical Example 6 at an object distance of infinity and at the wide angle end.

DESCRIPTION OF THE EMBODIMENTS

Preferred embodiments of the present invention will now be described in detail in accordance with the accompanying drawings.

A zoom lens according to the present invention includes, in order from an object side to an image side, a first lens unit having a positive refractive power, a second lens unit having a negative refractive power, a third lens unit having a positive refractive power, a fourth lens unit having a positive refractive power, and at least one rear lens unit.

The first lens unit is configured not to move for zooming, and the second lens unit to the fourth lens unit are configured to move while changing an interval between each pair of adjacent lens units during zooming. More specifically, during zooming from a wide angle end to a telephoto end, the second lens unit is configured to move toward the image side, and the third lens unit and the fourth lens unit are configured to move so that an interval between the third lens unit and the fourth lens unit becomes larger at the telephoto end than at the wide angle end.

In addition, during focus adjustment (focusing) from an object at infinity to an object at close distance, the third lens unit is configured to move toward the image side.

As the zoom lens according to the present invention, a zoom lens including the above-mentioned five lens units as its lens units is exemplified, but the present invention is not limited thereto.

For example, a lens unit having a negative (or positive) refractive power, which is configured to move during zooming, may be arranged between the second lens unit and the third lens unit. In addition, another lens unit may be arranged between the first lens unit and the second lens unit, between the third lens unit and the fourth lens unit, and/or between the fourth lens unit and a fifth lens unit. Moreover, a sixth lens unit, a seventh lens unit, and the like may further be arranged on the image side of the fifth lens unit.

Note that, the zoom lens according to each of Numerical Examples 1 to 7, which are to be described later, of the present invention has a structure of a five-unit zoom lens, in which a lens unit arranged closest to the object side is the first lens unit, and in which a lens unit arranged closest to the image side is the fifth lens unit. Further, it is desired that the second lens unit of the zoom lens according to the present invention be adjacent to the first lens unit at the wide angle end.

Moreover, in the zoom lens according to each of Numerical Examples 1 to 7, the third lens unit is moved toward the image side during the focus adjustment.

Moreover, in the zoom lens according to each of Numerical Examples 1 to 7, an aperture stop is arranged between the fourth lens unit and the fifth lens unit, but the present invention is not limited thereto. For example, the aperture stop may be arranged between the second lens unit and the third lens unit, or between the third lens unit and the fourth lens unit.

Figure 1:
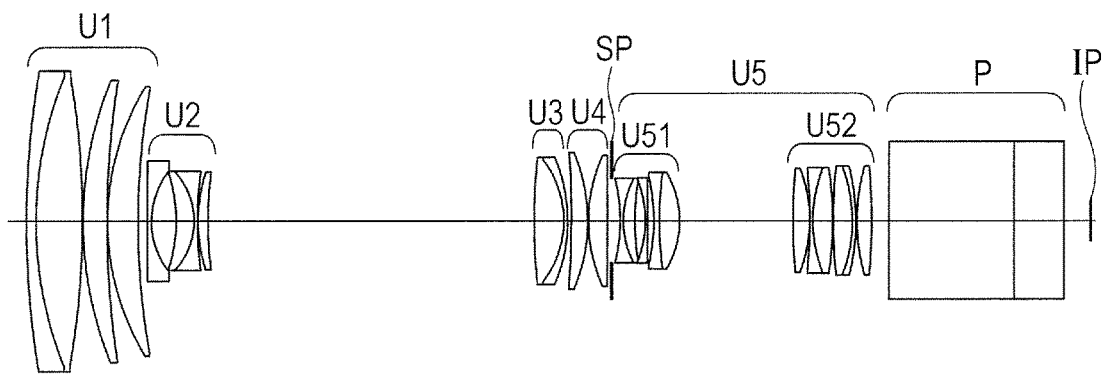
FIG. 1 is a lens cross-sectional view of a zoom lens according to Numerical Example 1 of the present invention when focusing on an object at infinity at a wide angle end.

FIG. 1 is a lens cross-sectional view of the zoom lens according to Numerical Example 1 of the present invention when focusing on the object at infinity at the wide angle end.

The zoom lens according to Numerical Example 1 of the present invention includes, in order from the object side to the image side, a first lens unit U1 having a positive refractive power, a second lens unit U2 having a negative refractive power, a third lens unit U3 having a positive refractive power, a fourth lens unit U4 having a positive refractive power, and a fifth lens unit U5 having a positive refractive power.

Here, the second lens unit U2 and the third lens unit U3 are variator lens units for varying a magnification, and the fourth lens unit U4 is a compensator lens unit for correcting an image plane variation accompanying the magnification varying.

The first lens unit U1 is configured not to move for zooming, and the second lens unit U2 is configured to move from the object side toward the image side during zooming from the wide angle end (short focal length end) to the telephoto end (long focal length end). Moreover, the third lens unit U3 is configured to move during zooming from the wide angle end to the telephoto end, and to move from the object side toward the image side during focusing from the object at infinity to the object at close distance. Further, the fourth lens unit U4 is configured to move in conjunction with the second lens unit U2 and the third lens unit U3. The fifth lens unit U5 is configured not to move for zooming.

Moreover, the aperture stop SP is arranged between the fourth lens unit U4 and the fifth lens unit U5.

Note that, in FIG. 1, in addition to the zoom lens according to Numerical Example 1, a glass block P functioning as a color separation prism or an optical filter, and an image plane IP corresponding to an image pickup surface of an image pickup element (photo-electric conversion element), which are arranged on the image side of the fifth lens unit, are also illustrated.

Note that, a structure similar to the above-mentioned structure is also adopted in each of Numerical Examples 2 to 7 of the present invention, and hence a description thereof may be omitted below.

Next, lens structures of the respective lens units of the zoom lens according to Numerical Example 1 are described. Note that, the lenses are arranged in order from the object side to the image side.

The first lens unit U1 includes a cemented lens formed of a negative lens and a positive lens, and two positive lenses. The second lens unit U2 includes a negative lens, a cemented lens formed of a positive lens and a negative lens, and a positive lens. The third lens unit U3 includes a cemented lens formed of a positive lens and a negative lens. The fourth lens unit U4 includes two positive lenses. The fifth lens unit U5 includes a first sub lens unit U51 including a cemented lens formed of a negative lens and a positive lens, a negative lens, and a cemented lens formed of a negative lens and a positive lens, and a second sub lens unit U52 including a positive lens, a cemented lens formed of a negative lens and a positive lens, a cemented lens formed of a positive lens and a negative lens, and a positive lens.

In other words, the fifth lens unit U5 includes the first sub lens unit U51 having a positive refractive power and the second sub lens unit U52 having a positive refractive power, which are separated by an air interval having a largest distance in the lens unit.

The zoom lens according to Numerical Example 1 has a zoom ratio of 21.5×, a half angle of field at the wide angle end of 34.9 degrees, and a half angle of field at the telephoto end of 1.9 degrees.

Figure 2A:
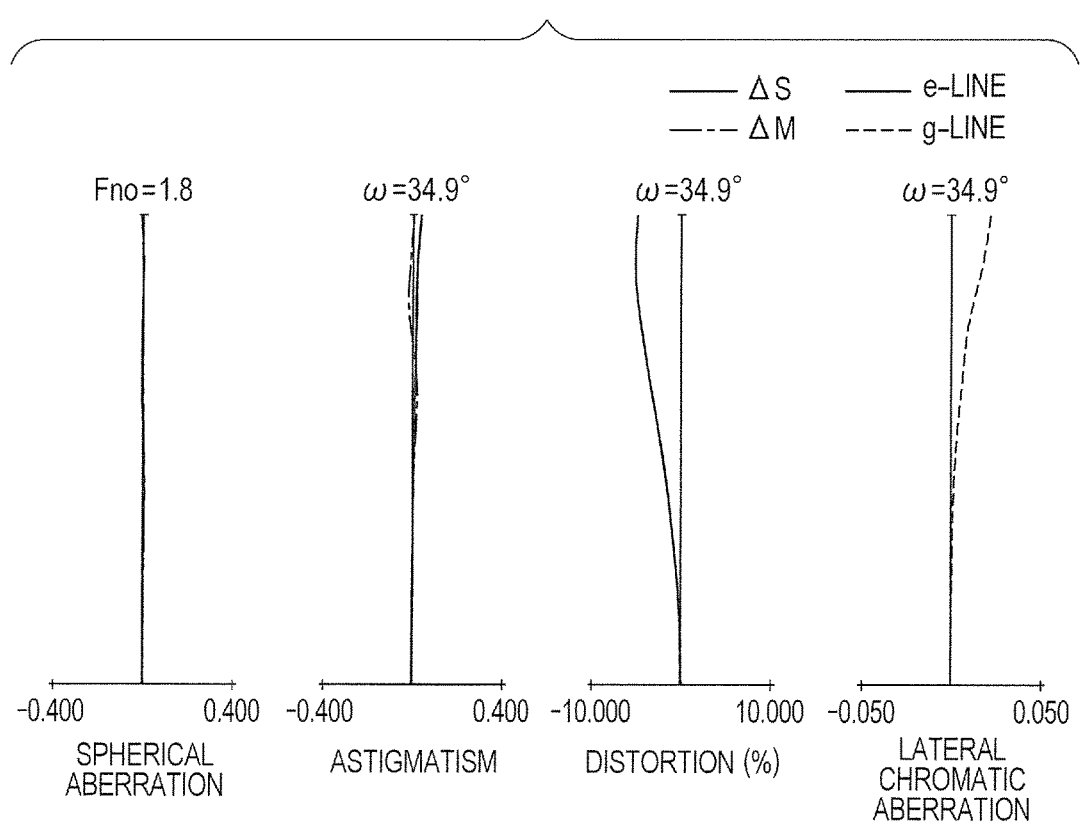
FIG. 2A is a longitudinal aberration diagram of the zoom lens according to Numerical Example 1 at an object distance of infinity and at the wide angle end.

FIG. 2A, FIG. 2B, and FIG. 2C are longitudinal aberration diagrams of the zoom lens according to Numerical Example 1 at an object distance of infinity and at the wide angle end, an intermediate zoom position having a focal length of 36.63 mm, and the telephoto end, respectively. It should be noted, however, that the value of the focal length is a value obtained when each value of Numerical Example 1, which is to be described below, is expressed in units of mm.

Note that, in the longitudinal aberration diagrams of FIG. 2A to FIG. 2C, the spherical aberration, the astigmatism, the distortion, and the lateral chromatic aberration are drawn on scales of 0.4 mm, 0.4 mm, 10%, and 0.05 mm, respectively.

In the longitudinal aberration diagrams of FIG. 2A to FIG. 2C, the spherical aberration is indicated by an e-line and a g-line, the astigmatism is indicated by a meridional image plane (ΔM) with respect to the e-line and a sagittal image plane (ΔS) with respect to the e-line, and the lateral chromatic aberration is indicated by the g-line. An f-number and a half angle of field are represented by Fno and ω, respectively. Note that, the wide angle end and the telephoto end refer to zoom positions when the second lens unit U2 for varying the magnification is positioned at one end and the other end of a range in which the second lens unit U2 is mechanically movable on an optical axis. Note that, a structure similar to the above-mentioned structure is also adopted in each of Numerical Examples 2 to 7 of the present invention, and hence a description thereof may be omitted below.

Figure 3:
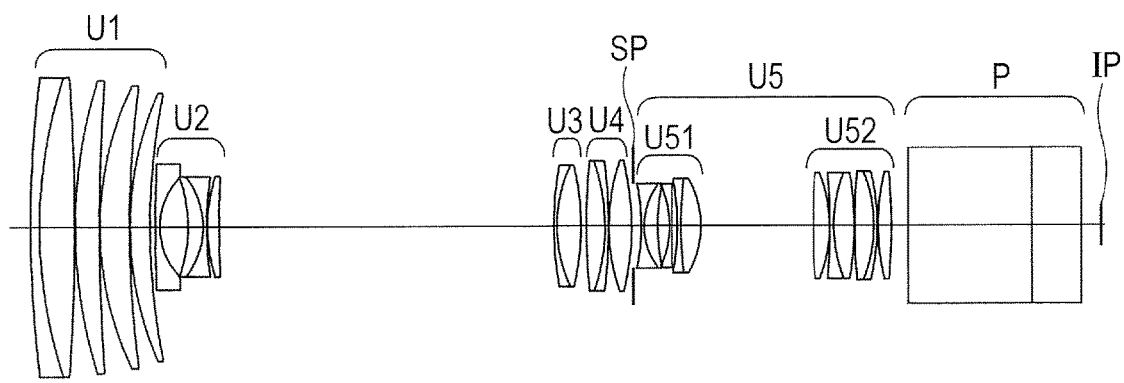
FIG. 3 is a lens cross-sectional view of a zoom lens according to Numerical Example 2 of the present invention when focusing on an object at infinity at a wide angle end.

FIG. 3 is a lens cross-sectional view of a zoom lens according to Numerical Example 2 of the present invention when focusing on an object at infinity at a wide angle end.

Lens structures of the respective lens units of the zoom lens according to Numerical Example 2 are as follows. Note that, the lenses are arranged in order from the object side to the image side.

The first lens unit U1 includes a cemented lens formed of a negative lens and a positive lens, and three positive lenses. The second lens unit U2 includes a negative lens, a cemented lens formed of a positive lens and a negative lens, and a positive lens. The third lens unit U3 includes a cemented lens formed of a negative lens and a positive lens. The fourth lens unit U4 includes a cemented lens formed of a positive lens and a negative lens, and a positive lens. The fifth lens unit U5 includes a first sub lens unit U51 including a cemented lens formed of a negative lens and a positive lens, a negative lens, and a cemented lens formed of a negative lens and a positive lens, and a second sub lens unit U52 including a positive lens, a cemented lens formed of a negative lens and a positive lens, a cemented lens formed of a positive lens and a negative lens, and a positive lens.

In other words, the fifth lens unit U5 includes the first sub lens unit U51 having a positive refractive power and the second sub lens unit U52 having a positive refractive power, which are separated by an air interval having a largest distance in the lens unit.

The zoom lens according to Numerical Example 2 has a zoom ratio of 21.5×, a half angle of field at the wide angle end of 34.9 degrees, and a half angle of field at the telephoto end of 1.9 degrees.

Figure 4A:
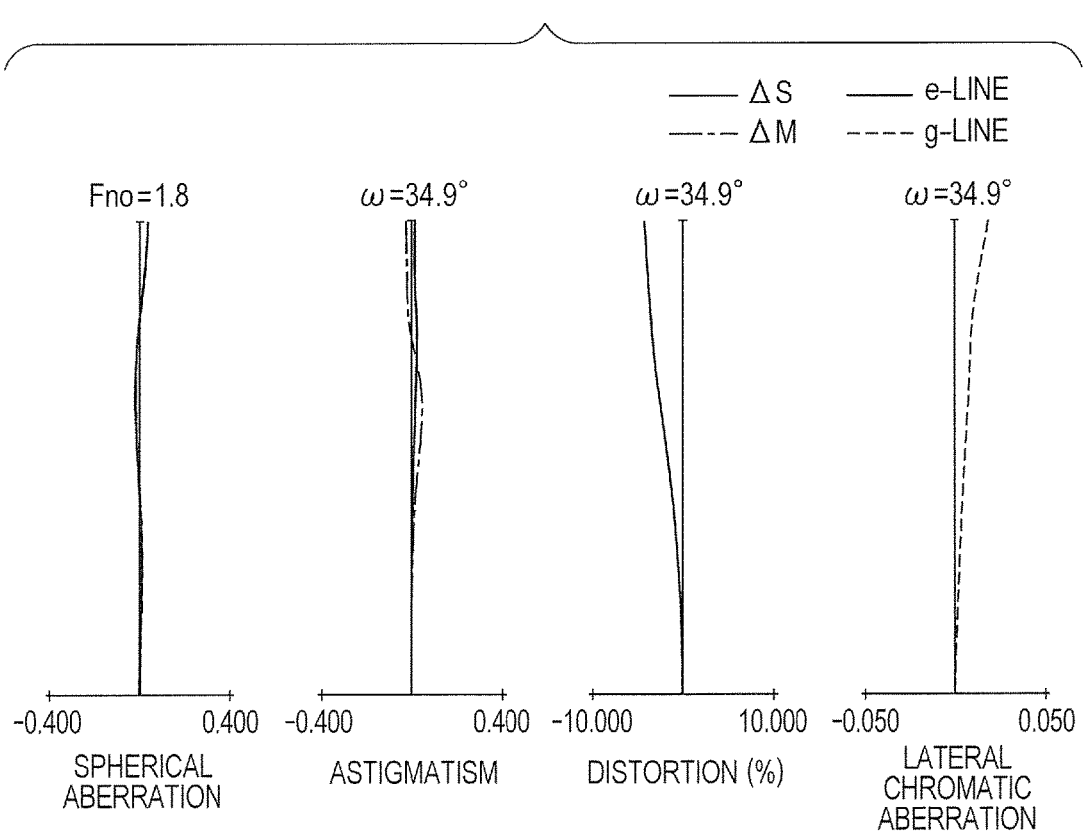
FIG. 4A is a longitudinal aberration diagram of the zoom lens according to Numerical Example 2 at an object distance of infinity and at the wide angle end.
Figure 4B:
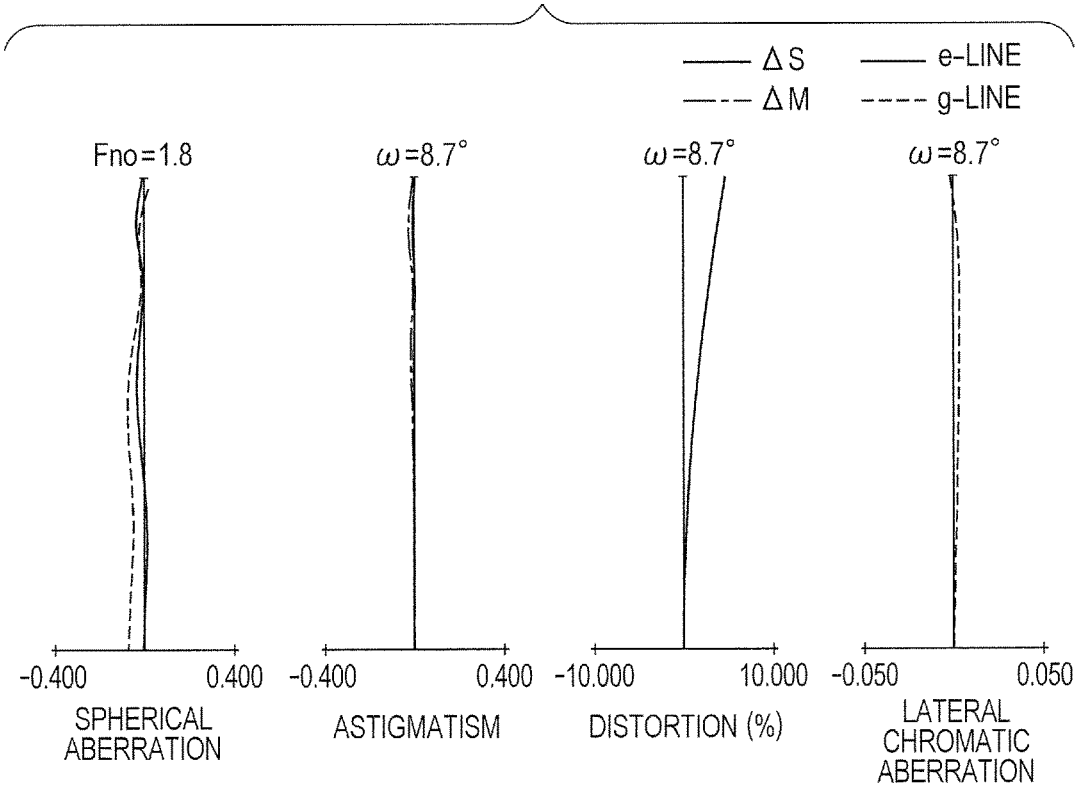
FIG. 4B is a longitudinal aberration diagram of the zoom lens according to Numerical Example 2 at the object distance of infinity and at an intermediate zoom position having a focal length of 36.07 mm.
Figure 4C:
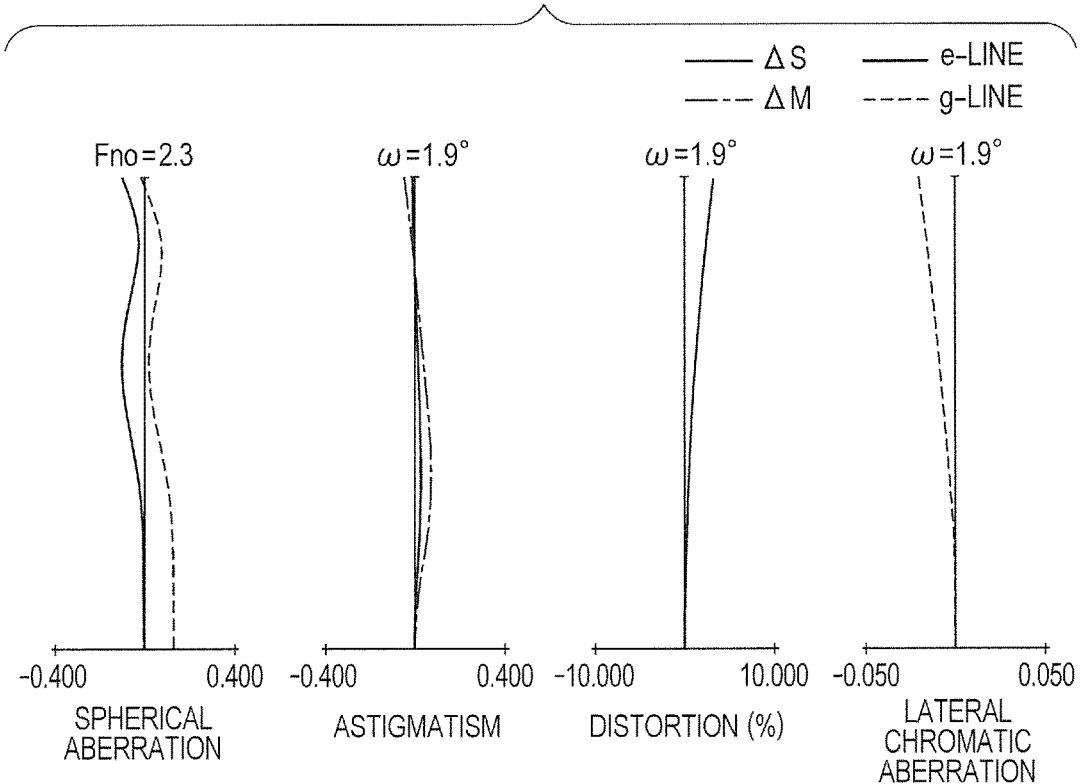
FIG. 4C is a longitudinal aberration diagram of the zoom lens according to Numerical Example 2 at the object distance of infinity and at a telephoto end.

FIG. 4A, FIG. 4B, and FIG. 4C are longitudinal aberration diagrams of the zoom lens according to Numerical Example 2 at an object distance of infinity and at the wide angle end, an intermediate zoom position having a focal length of 36.07 mm, and a telephoto end, respectively. It should be noted, however, that the value of the focal length is a value obtained when each value of Numerical Example 2, which is to be described below, is expressed in units of mm.

Note that, in the longitudinal aberration diagrams of FIG. 4A to FIG. 4C, the spherical aberration, the astigmatism, the distortion, and the lateral chromatic aberration are drawn on scales of 0.4 mm, 0.4 mm, 10%, and 0.05 mm, respectively.

Figure 5:
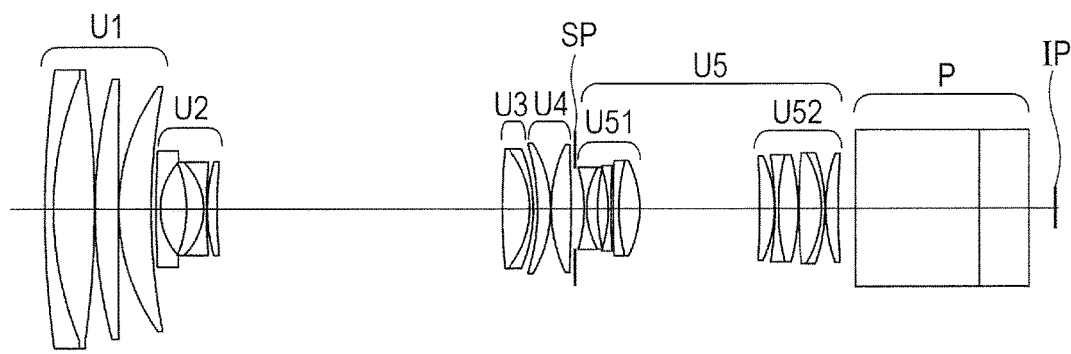
FIG. 5 is a lens cross-sectional view of a zoom lens according to Numerical Example 3 of the present invention when focusing on an object at infinity at a wide angle end.

FIG. 5 is a lens cross-sectional view of a zoom lens according to Numerical Example 3 of the present invention when focusing on an object at infinity at a wide angle end.

Lens structures of the respective lens units of the zoom lens according to Numerical Example 3 are as follows. Note that, the lenses are arranged in order from the object side to the image side.

The first lens unit U1 includes a cemented lens formed of a negative lens and a positive lens, and two positive lenses. The second lens unit U2 includes a negative lens, a cemented lens formed of a positive lens and a negative lens, and a positive lens. The third lens unit U3 includes a cemented lens formed of a positive lens and a negative lens. The fourth lens unit U4 includes two positive lenses. The fifth lens unit U5 includes a first sub lens unit U51 including a cemented lens formed of a negative lens and a positive lens, a negative lens, and a cemented lens formed of a negative lens and a positive lens, and a second sub lens unit U52 including a positive lens, a cemented lens formed of a negative lens and a positive lens, a cemented lens formed of a positive lens and a negative lens, and a positive lens.

In other words, the fifth lens unit U5 includes the first sub lens unit U51 having a positive refractive power and the second sub lens unit U52 having a positive refractive power, which are separated by an air interval having a largest distance in the lens unit.

The zoom lens according to Numerical Example 3 has a zoom ratio of 17.0×, a half angle of field at the wide angle end of 35.2 degrees, and a half angle of field at the telephoto end of 2.4 degrees.

Figure 6A:
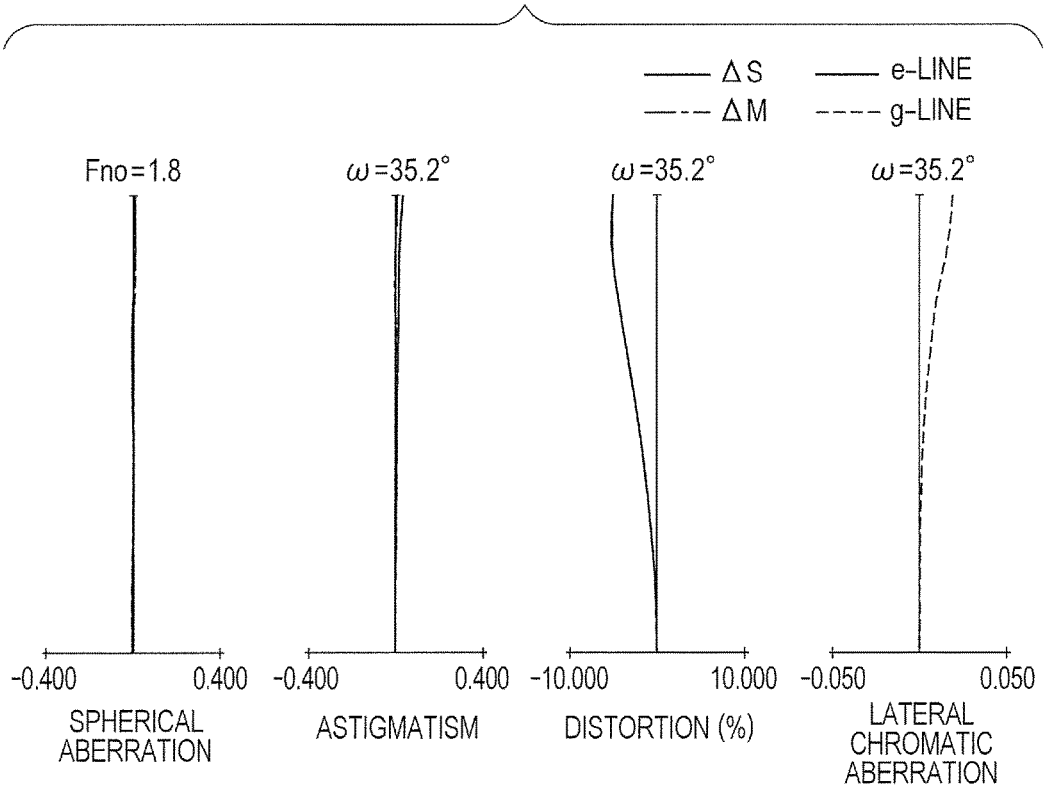
FIG. 6A is a longitudinal aberration diagram of the zoom lens according to Numerical Example 3 at an object distance of infinity and at the wide angle end.
Figure 6B:
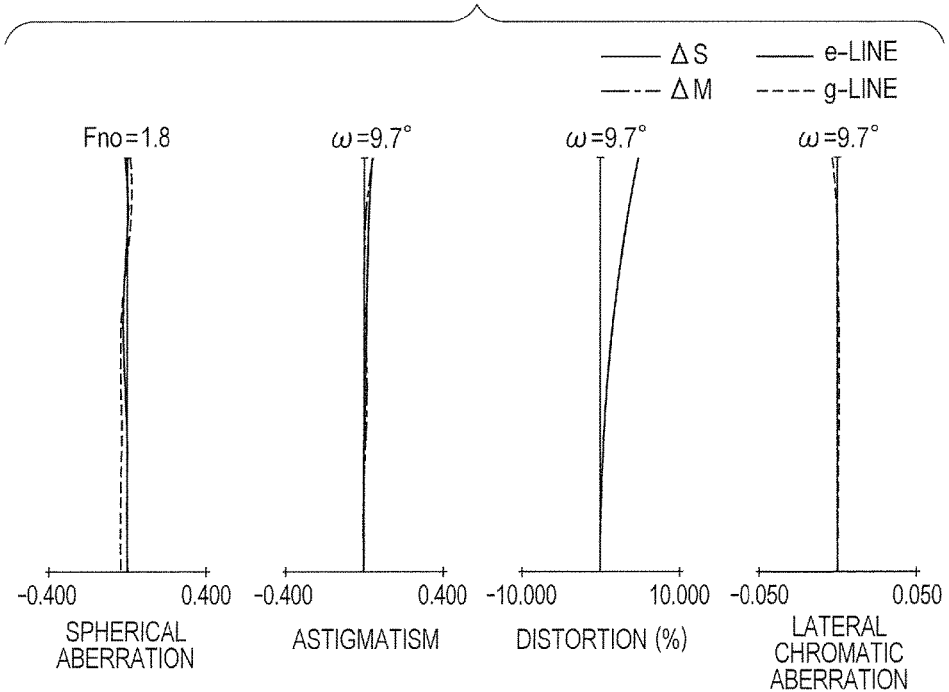
FIG. 6B is a longitudinal aberration diagram of the zoom lens according to Numerical Example 3 at the object distance of infinity and at an intermediate zoom position having a focal length of 32.16 mm.
Figure 6C:
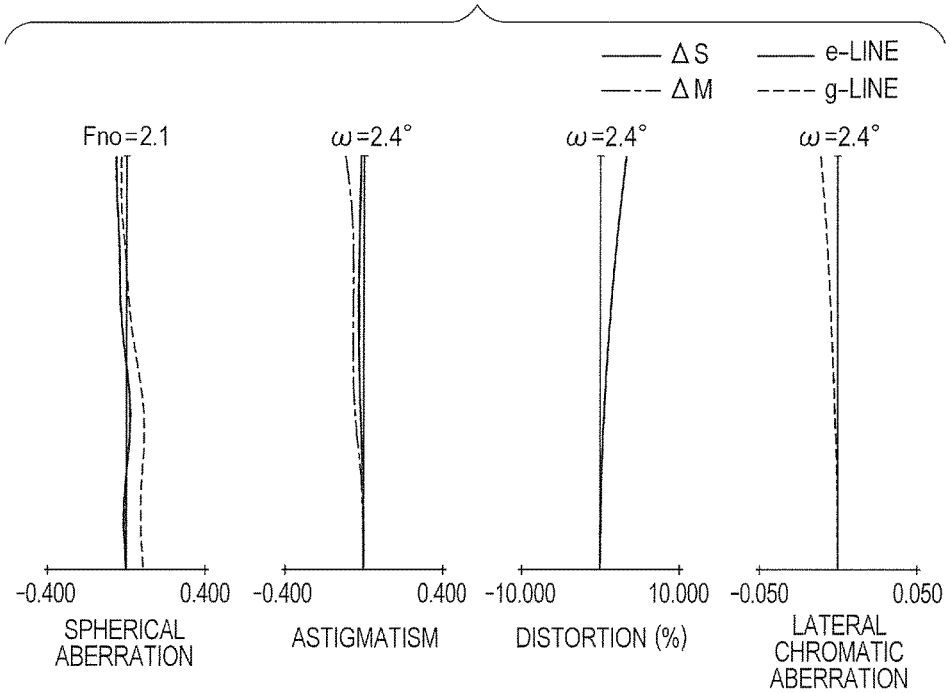
FIG. 6C is a longitudinal aberration diagram of the zoom lens according to Numerical Example 3 at the object distance of infinity and at a telephoto end.

FIG. 6A, FIG. 6B, and FIG. 6C are longitudinal aberration diagrams of the zoom lens according to Numerical Example 3 at an object distance of infinity and at the wide angle end, an intermediate zoom position having a focal length of 32.16 mm, and a telephoto end, respectively. It should be noted, however, that the value of the focal length is a value obtained when each value of Numerical Example 3, which is to be described below, is expressed in units of mm.

Note that, in the longitudinal aberration diagrams of FIG. 6A to FIG. 6C, the spherical aberration, the astigmatism, the distortion, and the lateral chromatic aberration are drawn on scales of 0.4 mm, 0.4 mm, 10%, and 0.05 mm, respectively.

FIG. 7 is a lens cross-sectional view of a zoom lens according to Numerical Example 4 of the present invention when focusing on an object at infinity at a wide angle end.

Lens structures of the respective lens units of the zoom lens according to Numerical Example 4 are as follows. Note that, the lenses are arranged in order from the object side to the image side.

The first lens unit U1 includes a negative lens and four positive lenses. The second lens unit U2 includes two negative lenses, a positive lens, and a negative lens. The third lens unit U3 includes a cemented lens formed of a negative lens and a positive lens. The fourth lens unit U4 includes a cemented lens formed of a positive lens and a negative lens, and a positive lens. The fifth lens unit U5 includes a first sub lens unit U51 including a cemented lens formed of a negative lens and a positive lens, a negative lens, and a cemented lens formed of a negative lens and a positive lens, and a second sub lens unit U52 including a positive lens, a cemented lens formed of a negative lens and a positive lens, a cemented lens formed of a positive lens and a negative lens, and a positive lens.

In other words, the fifth lens unit U5 includes the first sub lens unit U51 having a positive refractive power and the second sub lens unit U52 having a positive refractive power, which are separated by an air interval having a largest distance in the lens unit.

The zoom lens according to Numerical Example 4 has a zoom ratio of 30.0×, a half angle of field at the wide angle end of 28.8 degrees, and a half angle of field at the telephoto end of 1.1 degrees.

Figure 8B:
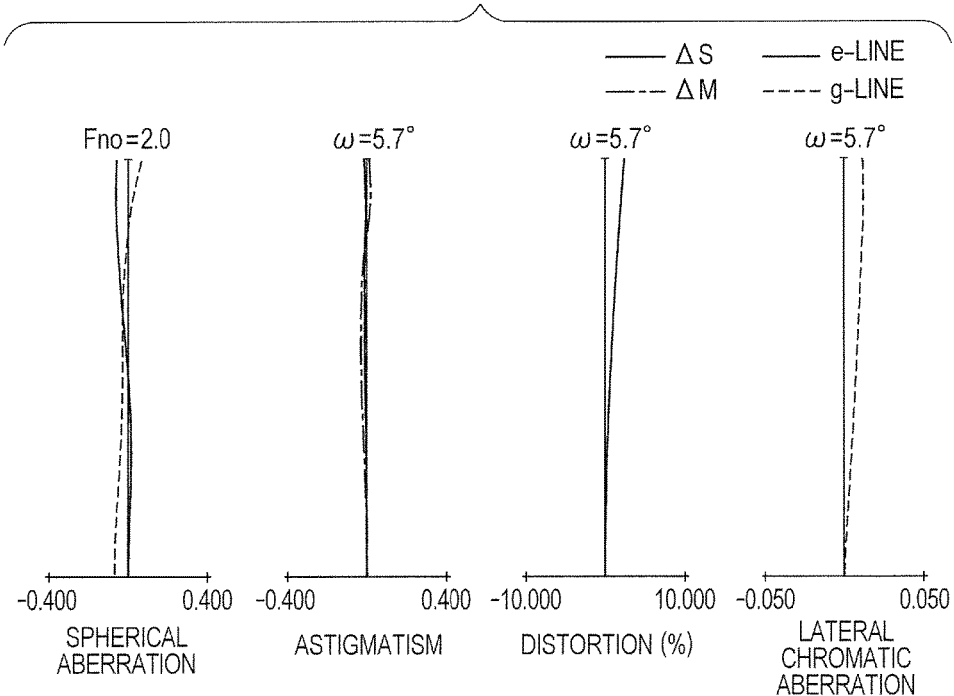
FIG. 8B is a longitudinal aberration diagram of the zoom lens according to Numerical Example 4 at the object distance of infinity and at an intermediate zoom position having a focal length of 54.72 mm.
Figure 8C:
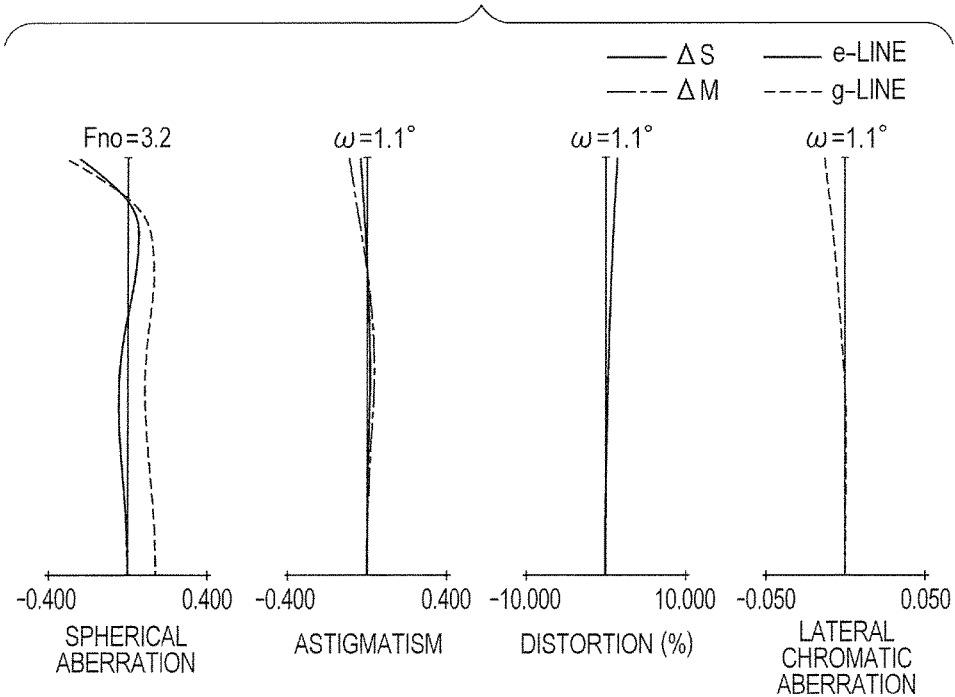
FIG. 8C is a longitudinal aberration diagram of the zoom lens according to Numerical Example 4 at the object distance of infinity and at a telephoto end.

FIG. 8A, FIG. 8B, and FIG. 8C are longitudinal aberration diagrams of the zoom lens according to Numerical Example 4 at an object distance of infinity and at the wide angle end, an intermediate zoom position having a focal length of 54.72 mm, and a telephoto end, respectively. It should be noted, however, that the value of the focal length is a value obtained when each value of Numerical Example 4, which is to be described below, is expressed in units of mm.

Note that, in the longitudinal aberration diagrams of FIG. 8A to FIG. 8C, the spherical aberration, the astigmatism, the distortion, and the lateral chromatic aberration are drawn on scales of 0.4 mm, 0.4 mm, 10%, and 0.05 mm, respectively.

Note that, in the zoom lens according to each of Numerical Examples 1 to 4, a focal length conversion optical system FDC configured to shift a variable focal length range of the zoom lens may be arranged between the first sub lens unit U51 and the second sub lens unit U52.

Figure 9:
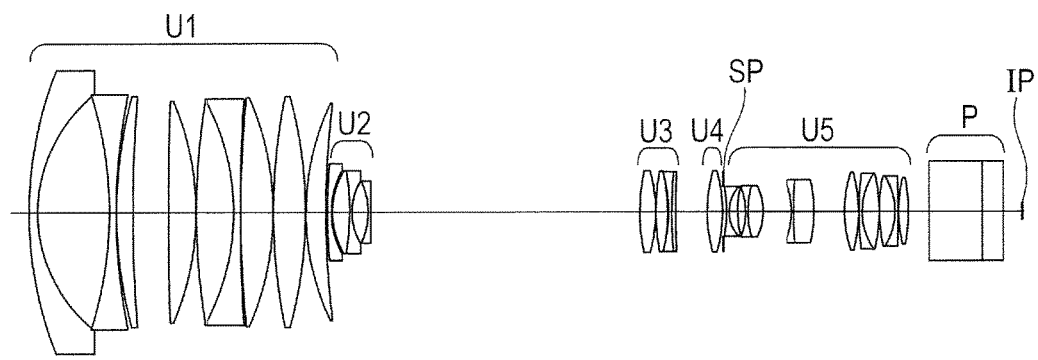
FIG. 9 is a lens cross-sectional view of a zoom lens according to Numerical Example 5 of the present invention when focusing on an object at infinity at a wide angle end.

FIG. 9 is a lens cross-sectional view of a zoom lens according to Numerical Example 5 of the present invention when focusing on an object at infinity at a wide angle end.

Lens structures of the respective lens units of the zoom lens according to Numerical Example 5 are as follows. Note that, the lenses are arranged in order from the object side to the image side.

The first lens unit U1 includes two negative lenses, two positive lenses, a cemented lens formed of a positive lens and a negative lens, and three positive lenses. The second lens unit U2 includes a negative lens, a cemented lens formed of a positive lens and a negative lens, and a negative lens. The third lens unit U3 includes two positive lenses, and a cemented lens formed of a negative lens and a positive lens. The fourth lens unit U4 includes a positive lens. The fifth lens unit U5 includes three cemented lenses each formed of a negative lens and a positive lens, a positive lens, a cemented lens formed of a negative lens and a positive lens, a cemented lens formed of a positive lens and a negative lens, and a positive lens.

The zoom lens according to Numerical Example 5 has a zoom ratio of 27.1×, a half angle of field at the wide angle end of 40.2 degrees, and a half angle of field at the telephoto end of 1.8 degrees.

Figure 10A:
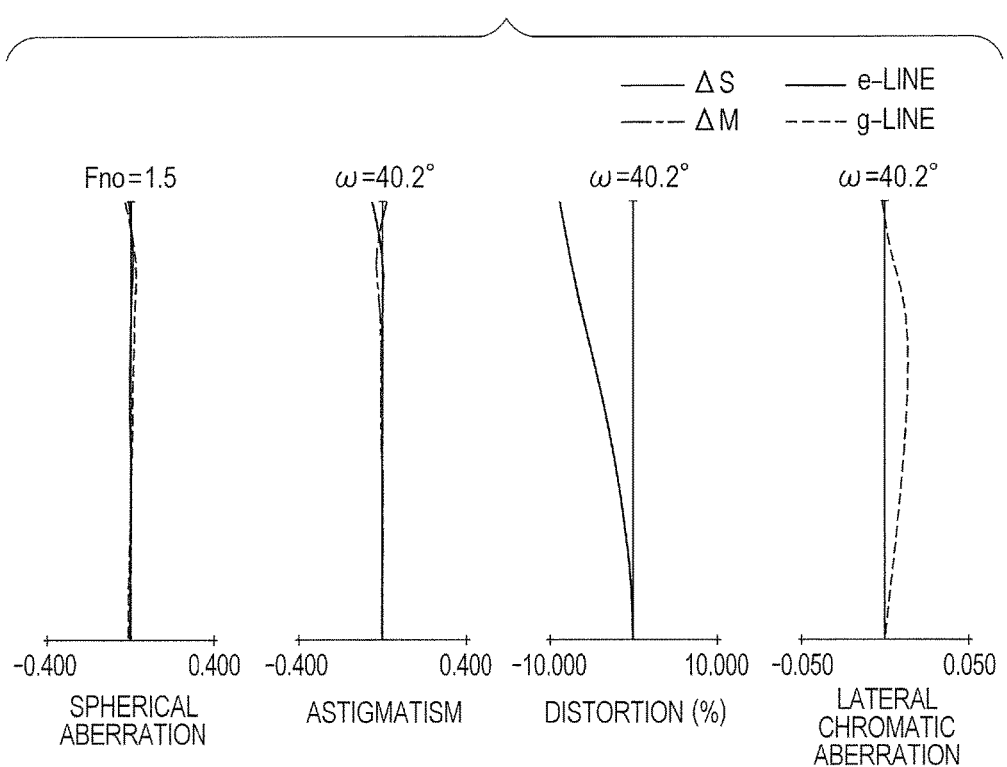
FIG. 10A is a longitudinal aberration diagram of the zoom lens according to Numerical Example 5 at an object distance of infinity and at the wide angle end.
Figure 10B:
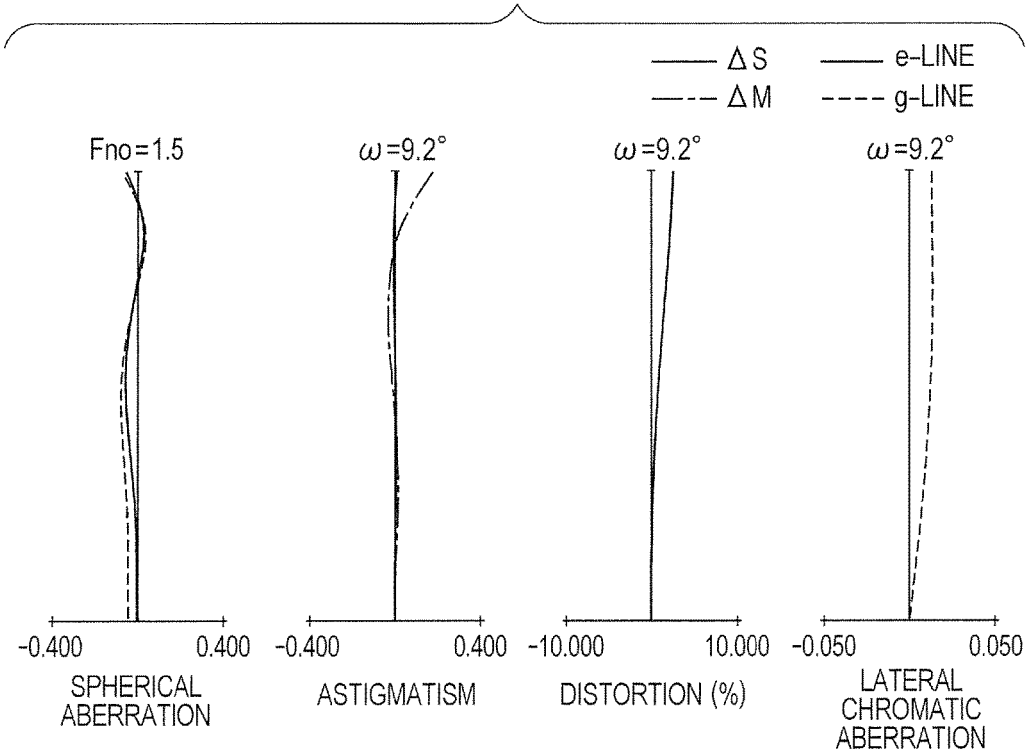
FIG. 10B is a longitudinal aberration diagram of the zoom lens according to Numerical Example 5 at the object distance of infinity and at an intermediate zoom position having a focal length of 33.88 mm.
Figure 10C:
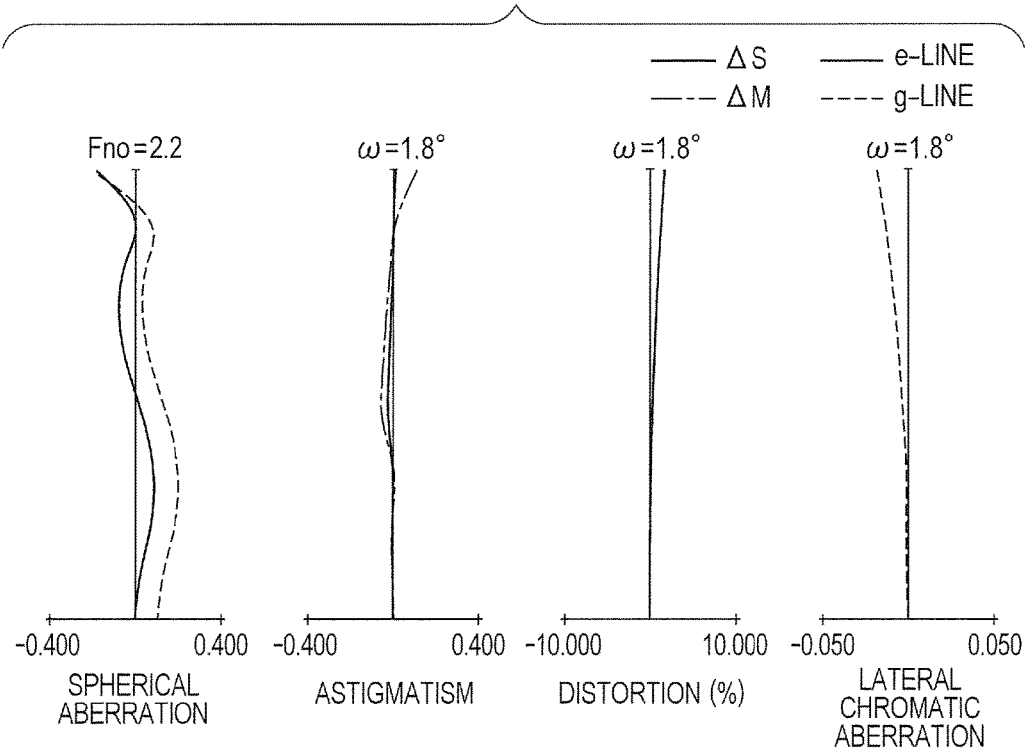
FIG. 10C is a longitudinal aberration diagram of the zoom lens according to Numerical Example 5 at the object distance of infinity and at a telephoto end.

FIG. 10A, FIG. 10B, and FIG. 10C are longitudinal aberration diagrams of the zoom lens according to Numerical Example 5 at an object distance of infinity and at the wide angle end, an intermediate zoom position having a focal length of 33.88 mm, and a telephoto end, respectively. It should be noted, however, that the value of the focal length is a value obtained when each value of Numerical Example 5, which is to be described below, is expressed in units of mm.

Note that, in the longitudinal aberration diagrams of FIG. 10A to FIG. 10C, the spherical aberration, the astigmatism, the distortion, and the lateral chromatic aberration are drawn on scales of 0.4 mm, 0.4 mm, 10%, and 0.05 mm, respectively.

FIG. 11 is a lens cross-sectional view of a zoom lens according to Numerical Example 6 of the present invention when focusing on an object at infinity at a wide angle end.

Lens structures of the respective lens units of the zoom lens according to Numerical Example 6 are as follows. Note that, the lenses are arranged in order from the object side to the image side.

The first lens unit U1 includes a positive lens, a negative lens, and three positive lenses. The second lens unit U2 includes three negative lenses and a positive lens. The third lens unit U3 includes a positive lens, a negative lens, and a positive lens. The fourth lens unit U4 includes a positive lens, and a cemented lens formed of a negative lens and a positive lens. The fifth lens unit U5 includes a first sub lens unit U51 including two cemented lenses each formed of a negative lens and a positive lens, a second sub lens unit U52 including a cemented lens formed of a negative lens and a positive lens, and a cemented lens formed of a positive lens and a negative lens, and a third sub lens unit U53 including a cemented lens formed of a positive lens and a negative lens.

In other words, the fifth lens unit U5 includes the first sub lens unit U51 having a negative refractive power, the second sub lens unit U52 having a negative refractive power, and the third sub lens unit U53 having a positive refractive power. Note that, the first sub lens unit U51 and the third sub lens unit U53 are configured not to move for zooming, and the second sub lens unit U52 is configured to move during zooming.

The zoom lens according to Numerical Example 6 has a zoom ratio of 20.0×, a half angle of field at the wide angle end of 21.2 degrees, and a half angle of field at the telephoto end of 1.1 degrees.

Figure 12B:
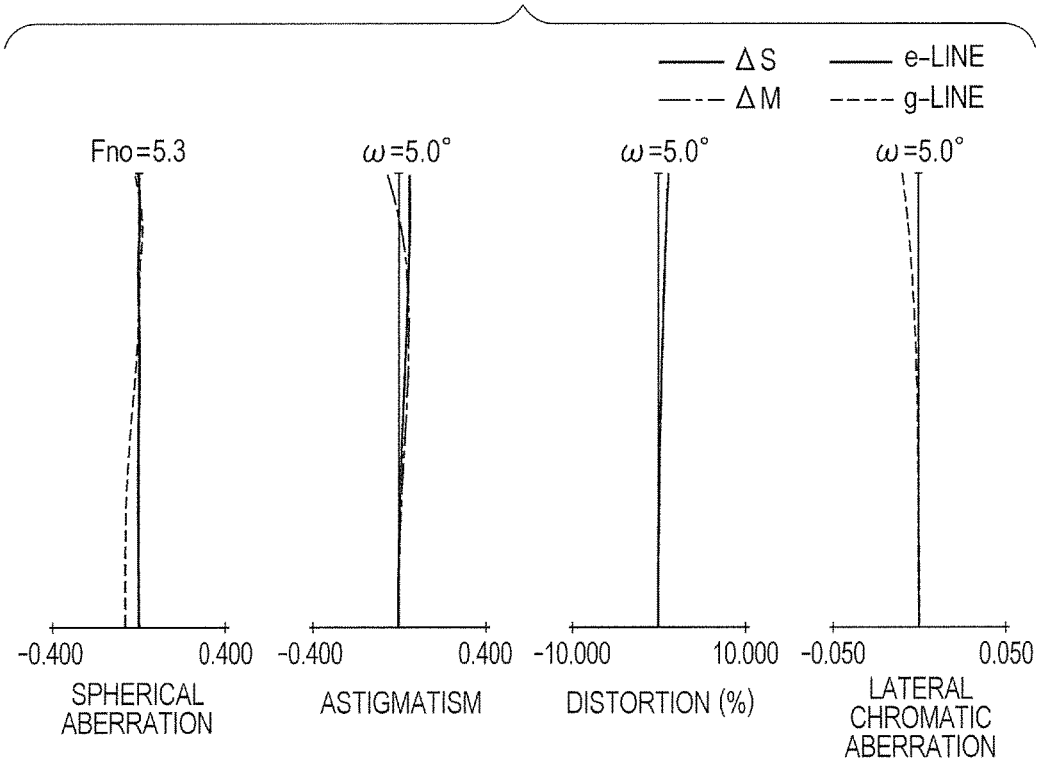
FIG. 12B is a longitudinal aberration diagram of the zoom lens according to Numerical Example 6 at the object distance of infinity and at an intermediate zoom position having a focal length of 178.02 mm.
Figure 12C:
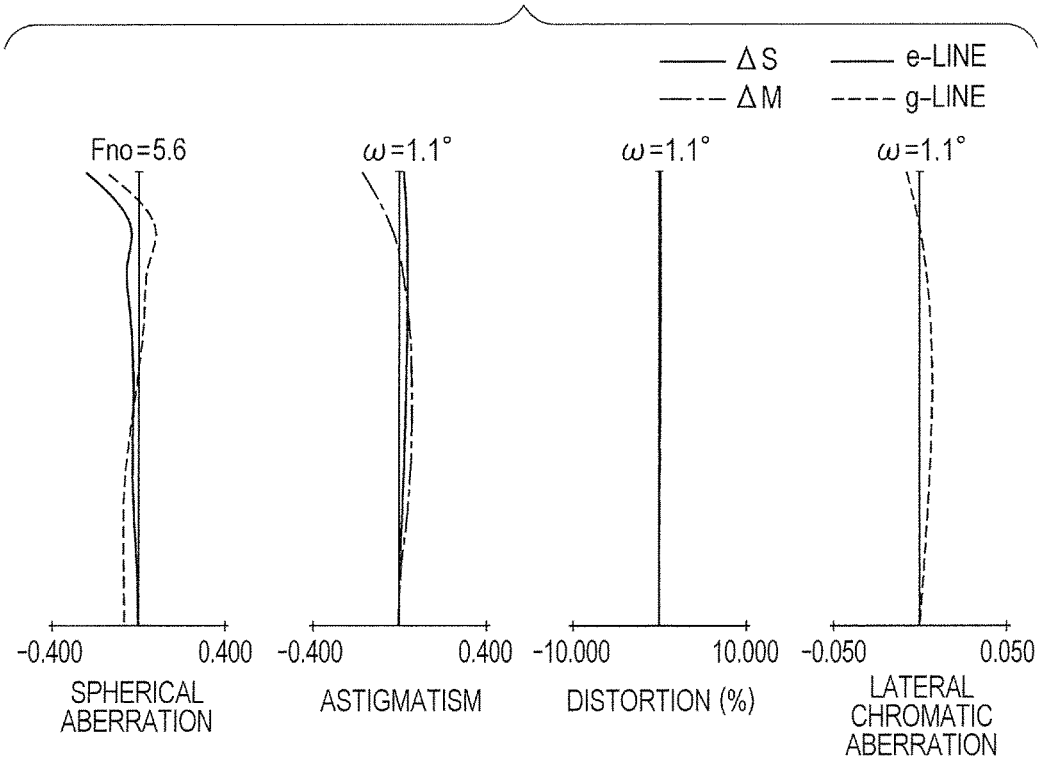
FIG. 12C is a longitudinal aberration diagram of the zoom lens according to Numerical Example 6 at the object distance of infinity and at a telephoto end.

FIG. 12A, FIG. 12B, and FIG. 12C are longitudinal aberration diagrams of the zoom lens according to Numerical Example 6 at an object distance of infinity and at the wide angle end, an intermediate zoom position having a focal length of 178.02 mm, and a telephoto end, respectively. It should be noted, however, that the value of the focal length is a value obtained when each value of Numerical Example 6, which is to be described below, is expressed in units of mm.

Note that, in the longitudinal aberration diagrams of FIG. 12A to FIG. 12C, the spherical aberration, the astigmatism, the distortion, and the lateral chromatic aberration are drawn on scales of 0.4 mm, 0.4 mm, 10%, and 0.05 mm, respectively.

Figure 13:
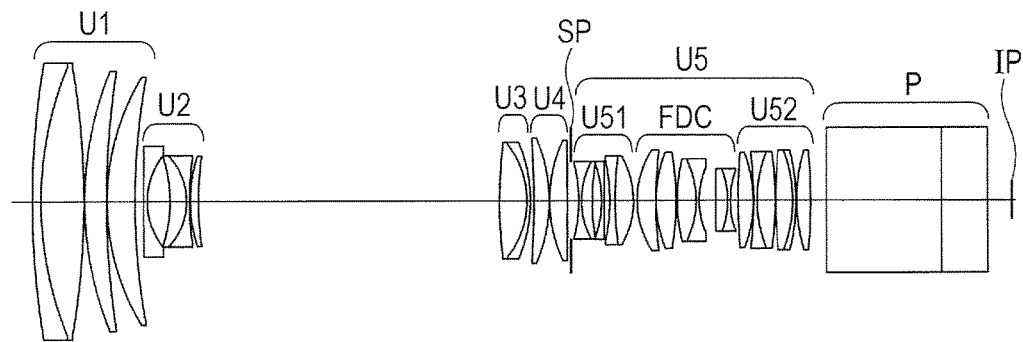
FIG. 13 is a lens cross-sectional view of a zoom lens according to Numerical Example 7 of the present invention when focusing on an object at infinity at a wide angle end.

FIG. 13 is a lens cross-sectional view of a zoom lens according to Numerical Example 7 of the present invention when focusing on an object at infinity at a wide angle end.

Lens structures of the respective lens units of the zoom lens according to Numerical Example 7 are as follows. Note that, the lenses are arranged in order from the object side to the image side.

The first lens unit U1 includes a cemented lens formed of a negative lens and a positive lens, and two positive lenses. The second lens unit U2 includes a negative lens, a cemented lens formed of a positive lens and a negative lens, and a positive lens. The third lens unit U3 includes a cemented lens formed of a positive lens and a negative lens. The fourth lens unit U4 includes two positive lenses. The fifth lens unit U5 includes a first sub lens unit U51 including a cemented lens formed of a negative lens and a positive lens, a negative lens, and a cemented lens formed of a negative lens and a positive lens, a focal length conversion optical system FDC including two positive lenses, and two cemented lenses each formed of a positive lens and a negative lens, and a second sub lens unit U52 including a positive lens, a cemented lens formed of a negative lens and a positive lens, a cemented lens formed of a positive lens and a negative lens, and a positive lens.

In other words, the fifth lens unit U5 includes the first sub lens unit U51 having a positive refractive power and the second sub lens unit U52 having a positive refractive power, which are separated by the largest air interval on the optical axis in the lens unit, and the focal length conversion optical system FDC, which is removably insertable in an optical path between the first sub lens unit U51 and the second sub lens unit U52. Note that, the first sub lens unit U51 and the second sub lens unit U52 are configured not to move for zooming.

The zoom lens according to Numerical Example 7 has a zoom ratio of 21.5×, a half angle of field at the wide angle end of 19.2 degrees, and a half angle of field at the telephoto end of 0.9 degrees.

Figure 14A:
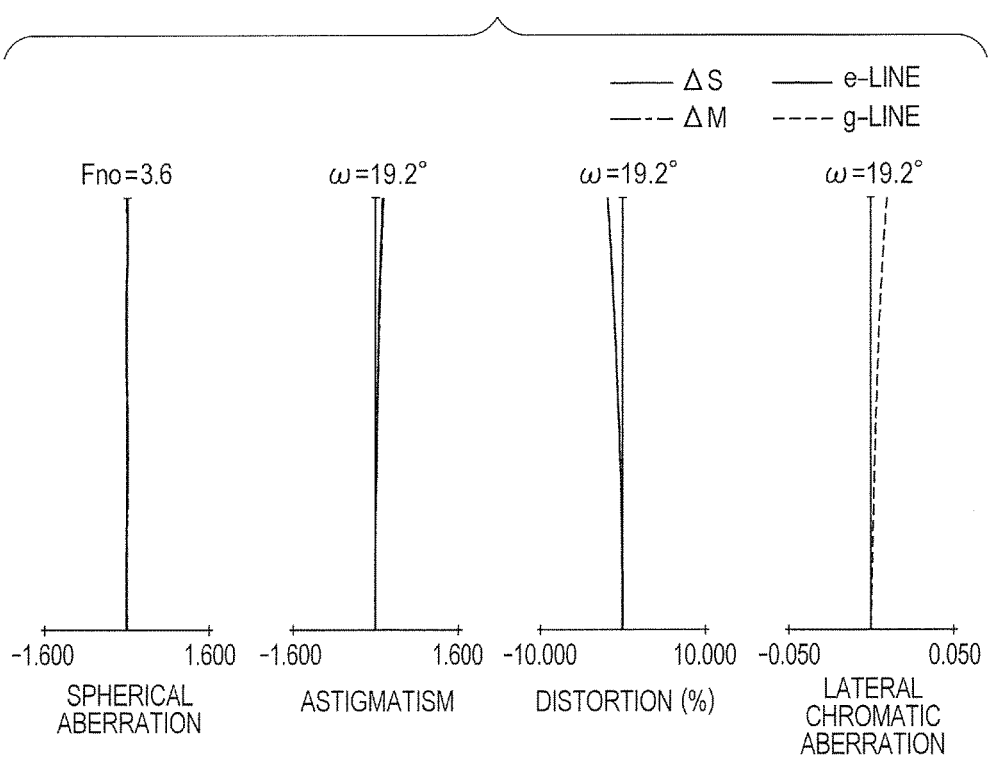
FIG. 14A is a longitudinal aberration diagram of the zoom lens according to Numerical Example 7 at an object distance of infinity and at the wide angle end.
Figure 14B:
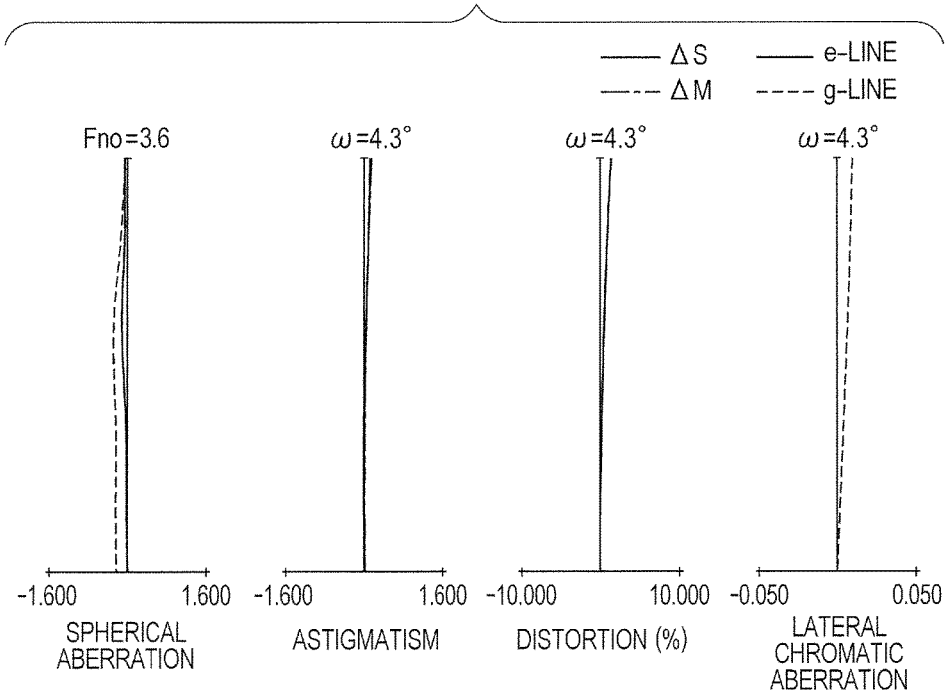
FIG. 14B is a longitudinal aberration diagram of the zoom lens according to Numerical Example 7 at the object distance of infinity and at an intermediate zoom position having a focal length of 73.26 mm.
Figure 14C:
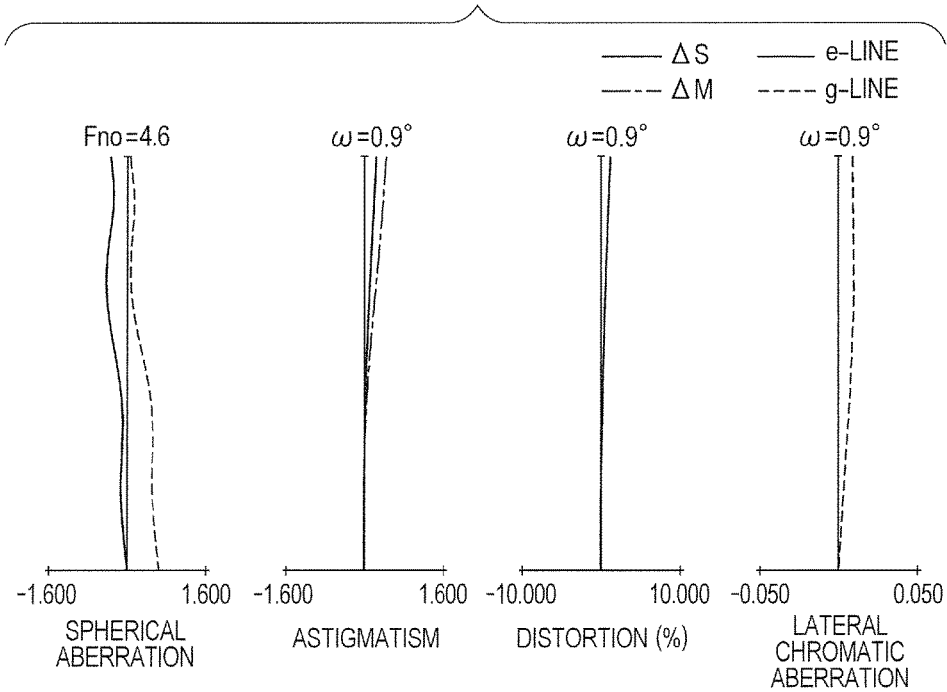
FIG. 14C is a longitudinal aberration diagram of the zoom lens according to Numerical Example 7 at the object distance of infinity and at a telephoto end.

FIG. 14A, FIG. 14B, and FIG. 14C are longitudinal aberration diagrams of the zoom lens according to Numerical Example 7 at an object distance of infinity and at the wide angle end, an intermediate zoom position having a focal length of 73.26 mm, and a telephoto end, respectively. It should be noted, however, that the value of the focal length is a value obtained when each value of Numerical Example 7, which is to be described below, is expressed in units of mm.

Note that, in the longitudinal aberration diagrams of FIG. 14A to FIG. 14C, the spherical aberration, the astigmatism, the distortion, and the lateral chromatic aberration are drawn on scales of 1.6 mm, 1.6 mm, 10%, and 0.05 mm, respectively.

Figure 15:
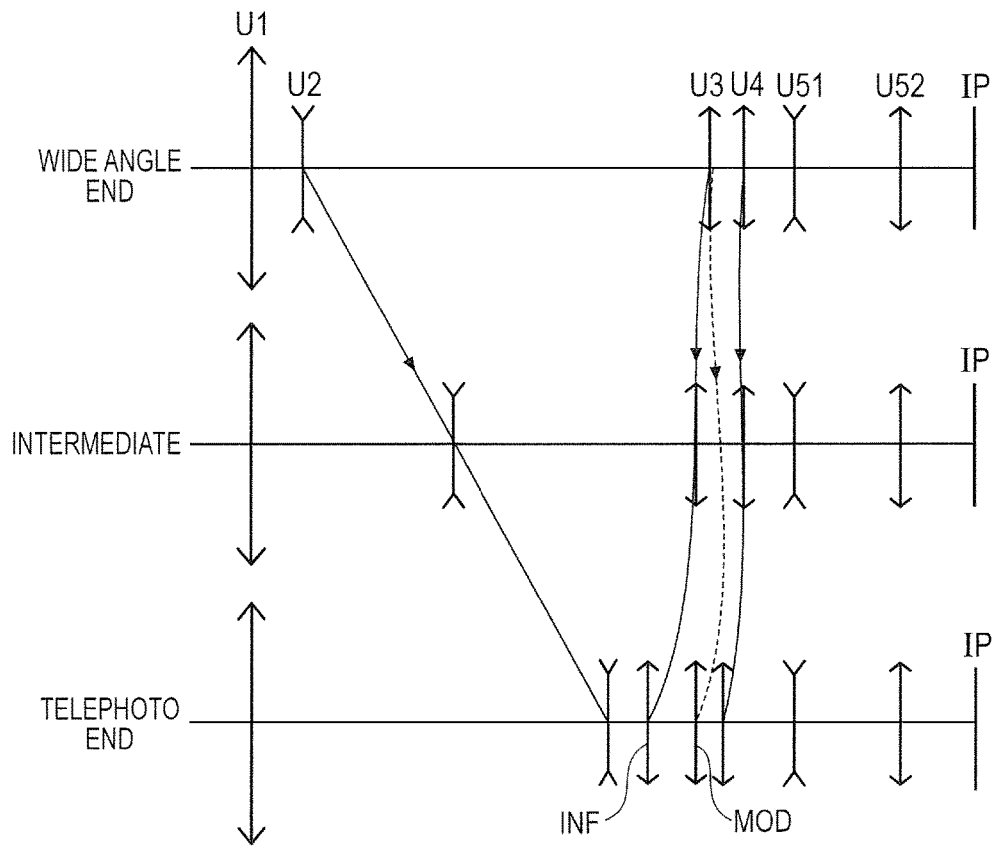
FIG. 15 is a diagram for illustrating a paraxial arrangement, and movement loci of a second lens unit U2, a third lens unit U3, and a fourth lens unit U4 during zooming from the wide angle end to the telephoto end in the zoom lens according to Numerical Example 1.

FIG. 15 is a diagram for illustrating a paraxial arrangement, and movement loci of the second lens unit U2, the third lens unit U3, and the fourth lens unit U4 during zooming from the wide angle end to the telephoto end in the zoom lens according to Numerical Example 1.

As illustrated in FIG. 15, the second lens unit U2 is configured to move from the object side toward the image side for varying the magnification from the wide angle end to the telephoto end. Moreover, the third lens unit U3 is configured to move from the image side toward the object side for varying the magnification from the wide angle end to the telephoto end, and to move from the object side toward the image side during the focus adjustment from the object at infinity to the object at close distance.

The third lens unit U3 is configured to move from the object side toward the image side during the focus adjustment from the object at infinity to the object at close distance, and an extension amount of the third lens unit U3 is increased from the wide angle end toward the telephoto end.

Figure 16:
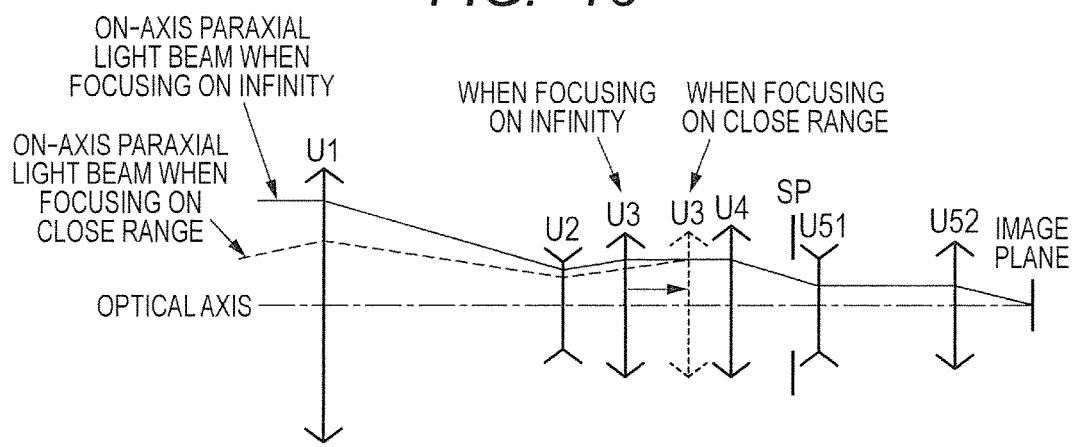
FIG. 16 is a diagram for illustrating the paraxial arrangement of the zoom lens according to Numerical Example 1 at the telephoto end, and an optical path of an on-axis paraxial light beam.

FIG. 16 is a diagram for illustrating the paraxial arrangement of the zoom lens according to Numerical Example 1 at the telephoto end, and an optical path of an on-axis paraxial light beam.

As illustrated in FIG. 16, the third lens unit U3 is moved from the object side toward the image side during the focus adjustment from the object at infinity to the object at close distance, with the result that the optical path of the on-axis paraxial light beam in the fourth lens unit U4 and the subsequent elements at each subject distance may be equalized, and an in-focus state may be maintained.

Note that, the description is given here only for the telephoto end, but the same is true for all zoom positions.

Figure 17A:
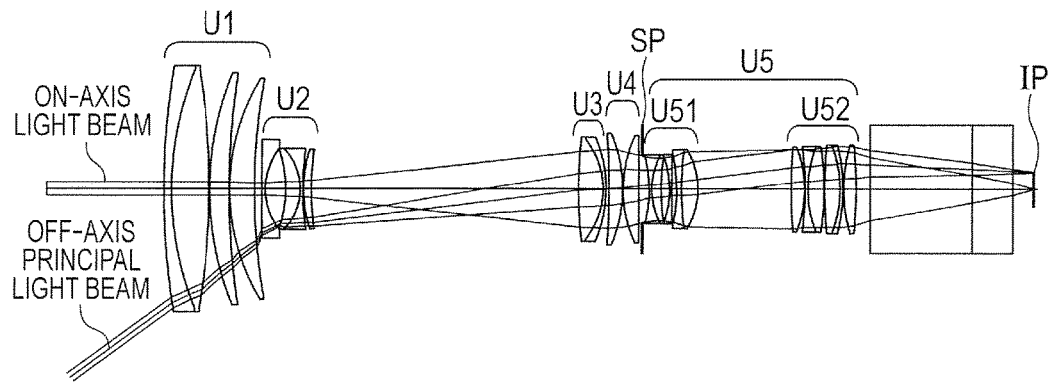
FIG. 17A is an optical path diagram of the zoom lens according to Numerical Example 1 at the wide angle end.
Figure 17B:
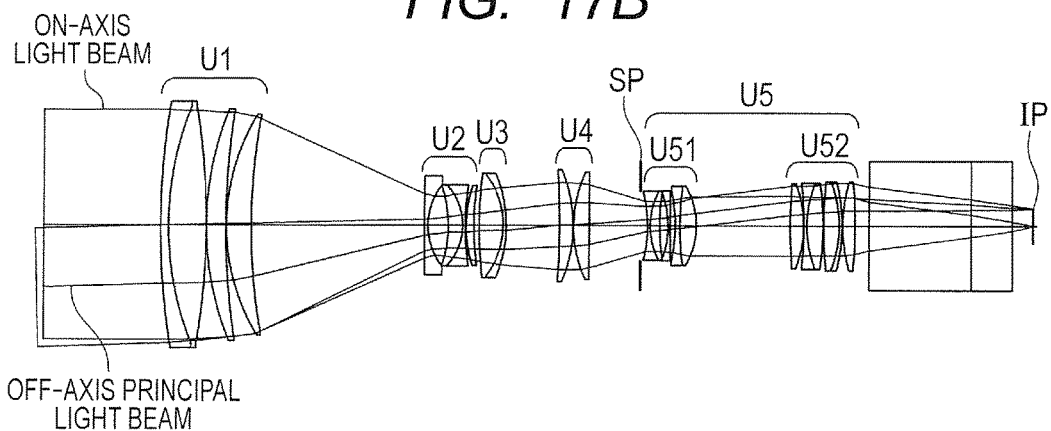
FIG. 17B is an optical path diagram of the zoom lens according to Numerical Example 1 at the telephoto end.

FIG. 17A and FIG. 17B are optical path diagrams of the zoom lens according to Numerical Example 1 at the wide angle end and the telephoto end, respectively.

In general, in the related-art broadcasting zoom lens in which a whole or a part of the first lens unit is used to perform the focus adjustment, heights from the optical axis of an on-axis light beam and an off-axis principal light beam passing through the focus lens unit are increased.

Therefore, in order to suppress aberration variations accompanying focusing, such as the lateral chromatic aberration and the distortion on a wide angle side, and the spherical aberration, field curvature, and the lateral chromatic aberration on a telephoto side, which occur in the first lens unit, the number of lenses of the first lens unit cannot be reduced. Therefore, in the related-art broadcasting zoom lens, it has been difficult to reduce the size and weight of the first lens unit.

Further, the first lens unit having a large lens diameter is moved during the focus adjustment, with the result that a driving force for the focus lens unit is increased, and rapid focusing has been difficult.

On the other hand, in the zoom lens according to the present invention, the third lens unit U3, at which heights from the optical axis of an on-axis light beam and an off-axis principal light beam are lower than those at the first lens unit, is used to perform the focus adjustment, with the result that the aberration variations accompanying focusing are satisfactorily corrected. Moreover, the reductions in size and weight of the first lens unit U1 are also attained. Further, the third lens unit U3 having a small lens diameter is used to perform the focus adjustment, with the result that the focus lens unit requires a small driving force, and rapid focusing becomes easy.

Note that, when the second lens unit U2 is used to perform the focus adjustment, a problem arises in that the focus adjustment cannot be performed at a particular zoom position. Alternatively, the fourth lens unit U4 may be used to perform the focus adjustment, but the fourth lens unit U4 has a larger lens diameter than that of the third lens unit U3, which is disadvantageous in reducing the size and weight of the focus lens unit. Further, in the case where the fourth lens unit U4 is used to perform the focus adjustment, the focus lens unit is in the vicinity of the aperture stop SP, which is not preferred in securing a drive mechanism and a driving space for the focus lens unit.

With the above-mentioned configuration, the zoom lens according to each of Numerical Examples 1 to 7 of the present invention achieves the reductions in size and weight, and high optical performance over the entire zoom range while having a wide angle of field and a high zoom ratio.

Here, when an imaging magnification of the third lens unit U3 is represented by β3, a movement amount MV3 of the third lens unit U3 in a case where the third lens unit U3 is used to perform the focus adjustment is expressed by the following equation:

$$MV3 \approx \beta 3^2/(1-\beta 3^2) \quad (1).$$

Note that, it can be seen from the equation (1) that, in a case where β3=±1, MV3 becomes infinite, and hence the focus adjustment cannot be performed.

Therefore, the zoom lens according to each of Numerical Examples 1 to 7 of the present invention is configured such that the imaging magnification of the third lens unit U3 takes a value other than ±1 at all zoom positions and all focus positions.

In this manner, the third lens unit U3 may be used to perform the focus adjustment at all zoom positions and all focus positions.

Figure 18:
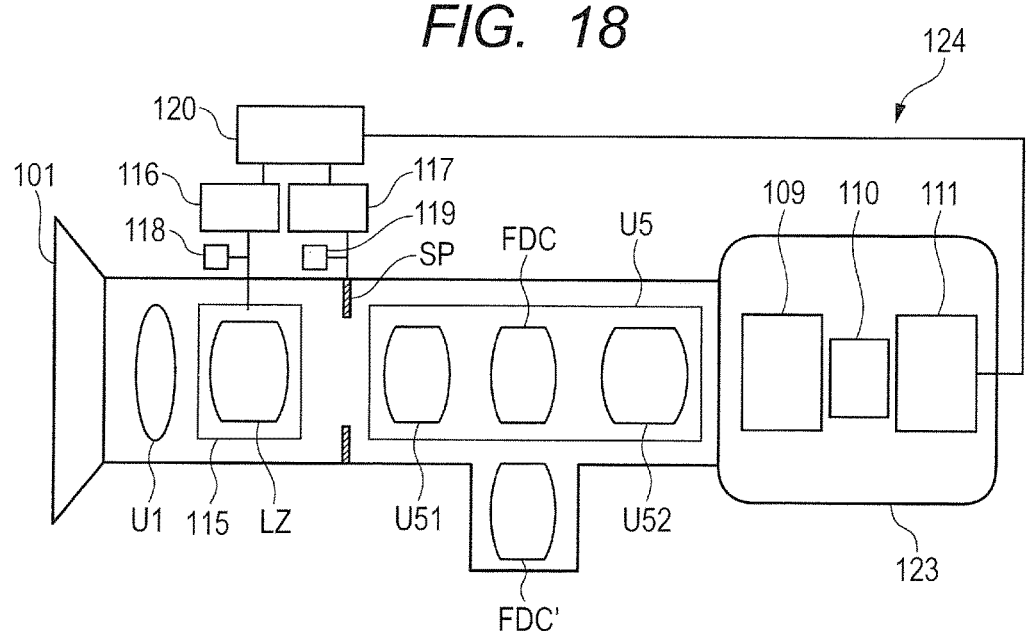
FIG. 18 is a schematic diagram of a main part of an image pickup apparatus such as a television camera system, in which the zoom lens according to Numerical Example 7 is mounted as a photographing optical system.

FIG. 18 is a schematic diagram of a main part of an image pickup apparatus 124, such as a television camera system, on which the zoom lens 101 according to Numerical Example 7 is mounted as a photographing optical system. Note that, on the image pickup apparatus 124, without limiting to the zoom lens according to Numerical Example 7, the zoom lens according to any one of Numerical Examples 1 to 6 may be mounted.

The image pickup apparatus 124 includes a zoom lens 101 according to Numerical Example 7, and a camera 123. The image pickup apparatus 124 also includes motors (drive units) 116 and 117, detectors 118 and 119 such as encoders, potentiometers, or photosensors, and a central processing unit (CPU) 120.

The zoom lens 101 includes a first lens unit U1, a magnification-varying lens unit LZ, a drive mechanism 115 such as a helicoid, a cam, or an actuator, an aperture stop SP, a fifth lens unit U5, and a second focal length conversion optical system FDC'. The magnification-varying lens unit LZ includes a second lens unit (variator lens unit) U2, a third lens unit (variator lens unit) U3, and a fourth lens unit (compensator lens unit) U4, which are not shown. The fifth lens unit U5 includes a first sub lens unit U51, a first focal length conversion optical system FDC, and a second sub lens unit U52, and the first focal length conversion optical system FDC may be replaced by the second focal length conversion optical system FDC' as necessary.

The camera 123 includes a glass block 109 corresponding to an optical filter or a color separation prism, an image pickup element (photo-electric conversion element) 110 such as a charge coupled device (CCD) sensor or a complementary metal oxide semiconductor (CMOS) sensor, and a CPU 111.

In the image pickup apparatus 124, the zoom lens 101 is configured to be removably attachable to the camera 123.

The drive mechanism 115 drives the magnification-varying lens unit LZ in an optical axis direction. The motors 116 and 117 electrically drive the drive mechanism 115 and the aperture stop SP, respectively. The detectors 118 and 119 detect a position of the magnification-varying lens unit LZ on the optical axis, and an aperture diameter of the aperture stop SP, respectively. The image pickup element 110 receives light of a subject image formed by the zoom lens 101. The CPUs 111 and 120 control various kinds of driving of the camera 123 and the zoom lens 101, respectively.

As described above, the zoom lens according to the present invention may be applied to a television camera system to realize the image pickup apparatus having the high optical performance.

It is preferred that the zoom lens according to the present invention satisfy the following conditional expression (2):

$$0.40 < |f1/f3| < 3.00 \tag{2}$$

Note that, the conditional expression (2) defines a ratio between a focal length f1 of the first lens unit U1 and a focal length f3 of the third lens unit U3. Moreover, a refractive power of a lens unit is defined by a reciprocal of a focal length of the lens unit.

When the refractive power of the third lens unit U3 becomes too strong with respect to the refractive power of the first lens unit U1 and the ratio exceeds the upper limit value of the conditional expression (2), variations in various aberrations are increased during zooming and the focus adjustment, and hence it becomes difficult to satisfactorily suppress the variations in various aberrations. Moreover, when the refractive power of the first lens unit U1 becomes too weak with respect to the refractive power of the third lens unit U3, the lens diameter of the first lens unit U1 is increased, and hence it becomes difficult to reduce the size and weight of the first lens unit U1.

On the other hand, when the refractive power of the third lens unit U3 becomes too weak with respect to the refractive power of the first lens unit U1 and the ratio falls below the lower limit value of the conditional expression (2), the movement amount of the third lens unit U3 is increased during zooming and the focus adjustment. Therefore, it becomes difficult to attain both the high zoom ratio and the reductions in size and weight. Moreover, when the refractive power of the first lens unit U1 becomes too strong with respect to the refractive power of the third lens unit U3, it becomes difficult to satisfactorily suppress the variations in various aberrations, such as the lateral chromatic aberration and the distortion on the wide angle side, and the spherical aberration on the telephoto side, which occur in the first lens unit U1.

In addition, it is more preferred to set the numerical value range of the conditional expression (2) as follows:

$$0.70 < |f1/f3| < 2.00 \tag{2a}$$

It is preferred that the zoom lens according to the present invention satisfy the following conditional expression (3):

$$2.00 < |f1/f2| < 8.00 \tag{3}$$

Note that, the conditional expression (3) defines a ratio between the focal length f1 of the first lens unit U1 and a focal length f2 of the second lens unit U2.

When the refractive power of the second lens unit U2 becomes too strong with respect to the refractive power of the first lens unit U1 and the ratio exceeds the upper limit value of the conditional expression (3), variations in various aberrations such as the spherical aberration and coma are increased during zooming and hence it becomes difficult to satisfactorily correct the variations in various aberrations. Moreover, when the refractive power of the first lens unit U1 becomes too weak with respect to the refractive power of the second lens unit U2, the lens diameter of the first lens unit U1 is increased, and hence it becomes difficult to reduce the size and weight of the first lens unit U1.

On the other hand, when the refractive power of the second lens unit U2 becomes too weak with respect to the refractive power of the first lens unit U1 and the ratio falls below the lower limit value of the conditional expression (3), the movement amount of the second lens unit U2 is increased during zooming, and hence it becomes difficult to attain both the high zoom ratio and the reductions in size and weight. Moreover, when the refractive power of the first lens unit U1 becomes too strong with respect to the refractive power of the second lens unit U2, it becomes difficult to satisfactorily suppress the variations in various aberrations, such as the lateral chromatic aberration and the distortion on the wide angle side, and the spherical aberration on the telephoto side, which occur in the first lens unit U1.

In addition, it is more preferred to set the numerical value range of the conditional expression (3) as follows:

$$3.00 < |f1/f2| < 7.50 \tag{3a}$$

It is preferred that the zoom lens according to the present invention satisfy the following conditional expression (4):

$$0.80 < |f1/f4| < 4.00 \tag{4}$$

Note that, the conditional expression (4) defines a ratio between the focal length f1 of the first lens unit U1 and a focal length f4 of the fourth lens unit U4.

When the refractive power of the fourth lens unit U4 becomes too strong with respect to the refractive power of the first lens unit U1 and the ratio exceeds the upper limit value of the conditional expression (4), variations in various aberrations such as the spherical aberration and the coma are increased during zooming, and hence it becomes difficult to satisfactorily correct the variations in various aberrations. Moreover, when the refractive power of the first lens unit U1 becomes too weak with respect to the refractive power of the fourth lens unit U4, the lens diameter of the first lens unit U1 is increased, and hence it becomes difficult to reduce the size and weight of the first lens unit U1.

On the other hand, when the refractive power of the fourth lens unit U4 becomes too weak with respect to the refractive power of the first lens unit U1 and the ratio falls below the lower limit value of the conditional expression (4), the movement amount of the fourth lens unit U4 is increased during zooming, and hence it becomes difficult to attain both the high zoom ratio and the reductions in size and weight. Moreover, when the refractive power of the first lens unit U1 becomes too strong with respect to the refractive power of the fourth lens unit U4, it becomes difficult to satisfactorily suppress the variations in various aberrations, such as the lateral chromatic aberration and the distortion on the wide angle side, and the spherical aberration on the telephoto side, which occur in the first lens unit U1.

In addition, it is more preferred to set the numerical value range of the conditional expression (4) as follows:

$$1.30 < |f1/f4| < 3.00 \tag{4a}$$

It is preferred that the zoom lens according to the present invention satisfy the following conditional expression (5):

$$0.01 < L34w/L34t < 0.99 \tag{5}$$

Note that, the conditional expression (5) defines a ratio of air intervals L34w and L34t on the optical axis between the third lens unit U3 and the fourth lens unit U4 when focusing on the object at infinity at the wide angle end and the telephoto end, respectively.

In general, a combined focal length f34 of the third lens unit U3 and the fourth lens unit U4 is expressed by the following equation (6):

$$1/f34 = 1/f3 + 1/f4 - e'34/(f3 \times f4) \tag{6}$$

In the expression, e'34 is a principal point interval between the third lens unit U3 and the fourth lens unit U4.

When the air interval L34w on the optical axis between the third lens unit U3 and the fourth lens unit U4 at the wide angle end is increased and the ratio exceeds the upper limit value of the conditional expression (5), the combined focal length f34 of the third lens unit U3 and the fourth lens unit U4 becomes too long. Therefore, a length of a zoom unit becomes too long, and hence it becomes difficult to suppress an increase in total length of the zoom lens. Moreover, when the air interval L34t on the optical axis between the third lens unit U3 and the fourth lens unit U4 at the telephoto end is decreased, it becomes difficult to sufficiently secure the movement amount of the third lens unit U3 accompanying the focus adjustment at the telephoto end.

On the other hand, when the air interval L34t on the optical axis between the third lens unit U3 and the fourth lens unit U4 at the telephoto end is increased and the ratio falls below the lower limit value of the conditional expression (5), the combined focal length f34 of the third lens unit U3 and the fourth lens unit U4 becomes too long. Therefore, a length of a zoom unit becomes too long, and hence it becomes difficult to suppress the increase in total length of the zoom lens.

In addition, it is more preferred to set the numerical value range of the conditional expression (5) as follows:

$$0.05 < L34w/L34t < 0.97 \quad (5a).$$

It is preferred that the zoom lens according to the present invention satisfy the following conditional expression (7):

$$1.50 < \ln(Z2)/\ln(Z3 \times Z4) < 4.50 \quad (7).$$

Note that, the conditional expression (7) defines a ratio between a natural logarithm ln(Z2) of a magnification-varying ratio Z2 of the second lens unit U2 and a natural logarithm ln(Z3×Z4) of a combined magnification-varying ratio Z3×Z4 of the third lens unit U3 and the fourth lens unit U4 when focusing on the object at infinity.

Note that, magnification-varying ratios Z2, Z3, and Z4 are equal to β2t_INF/β2w_INF, β3t_INF/β3w_INF, and β4t_INF/β4w_INF, respectively. Here, βnw_INF and βnt_INF (n=2, 3, 4) are imaging magnifications of the n-th lens unit Un when focusing on infinity at the wide angle end and the telephoto end, respectively.

The zoom lens according to the present invention has a structure in which, when focusing on infinity, the magnification-varying ratio Z2 of the second lens unit U2 becomes larger than the combined magnification-varying ratio Z3×Z4 of the third lens unit U3 and the fourth lens unit U4 so that a share of magnification varying on the second lens unit U2, which is a main magnification-varying lens unit, becomes large.

When the ratio exceeds the upper limit of the conditional expression (7), a movement amount of the second lens unit U2 toward the image side during zooming becomes large to increase the variations in various aberrations during zooming, and hence it becomes difficult to satisfactorily suppress the variations in various aberrations.

On the other hand, when the ratio falls below the lower limit of the conditional expression (7), a sufficient magnification-varying ratio cannot be obtained by the second lens unit U2, which is the main magnification-varying lens unit, with the result that movement amounts of the third lens unit U3 and the fourth lens unit U4 are increased to obtain the sufficient magnification-varying ratio. Therefore, the length of the zoom unit becomes too long, and hence it becomes difficult to suppress the increase in total length of the zoom lens.

In addition, it is more preferred to set the numerical value range of the conditional expression (7) as follows:

$$1.80 < \ln(Z2)/\ln(Z3 \times Z4) < 3.60 \quad (7a).$$

It is preferred that the zoom lens according to the present invention satisfy the following conditional expressions (8) and (9):

$$0.10 < \phi1p \times f1 < 0.80 \quad (8)$$

$$-1.50 < \phi1n \times f1 < -0.10 \quad (9).$$

Note that, the conditional expressions (8) and (9) define average powers $\phi1p$ and $\phi1n$ of positive lenses and negative lenses forming the first lens unit U1, respectively.

When the average powers exceed the upper limit value of the conditional expression (8) and fall below the lower limit value of the conditional expression (9), respectively, the powers of the respective lenses of the first lens unit U1 become too strong. This increase the variations in various aberrations, such as the lateral chromatic aberration and the distortion on the wide angle side, and the spherical aberration at the telephoto end, which occur in the first lens unit U1, and hence it becomes difficult to satisfactorily suppress the aberrations. Moreover, thicknesses of the respective lenses in the first lens unit U1 are increased, and hence it becomes difficult to reduce the size and weight of the first lens unit U1.

On the other hand, when the average powers fall below the lower limit value of the conditional expression (8) and exceed the upper limit value of the conditional expression (9), respectively, the powers of the respective lenses of the first lens unit U1 become too weak. As a result, in order for the first lens unit U1 to have an appropriate power, an interval between the positive lenses and the negative lenses needs to be increased, and hence it becomes difficult to reduce the size and weight of the first lens unit U1.

In addition, it is more preferred to set the numerical value range of the conditional expressions (8) and (9) as follows:

$$0.20 < \phi1p \times f1 < 0.70 \quad (8a)$$

$$-1.30 < \phi1n \times f1 < -0.30 \quad (9a).$$

In the zoom lens according to the present invention, it is preferred that the first lens unit U1 include four or five lenses. When the number of lenses of the first lens unit U1 is more than five, it becomes difficult to reduce the size and weight of the first lens unit U1. On the other hand, when the number of lenses of the first lens unit U1 is less than four, the powers of the respective lenses forming the first lens unit U1 become too strong. Therefore, the variations in various aberrations, such as the lateral chromatic aberration and the distortion on the wide angle side, and the spherical aberration at the telephoto end, which occur in the first lens unit U1, are increased, and hence it becomes difficult to satisfactorily suppress the aberrations.

It is preferred that the zoom lens according to the present invention satisfy the following conditional expression (10):

$$0.50 < \beta5w < 3.50 \quad (10).$$

Note that, the conditional expression (10) defines an imaging magnification $\beta5w$ of the fifth lens unit U5 at the wide angle end.

When the imaging magnification exceeds the upper limit value of the conditional expression (10), the lateral chromatic aberration, the distortion, and the like, in particular, off-axis aberrations, which occur in the fifth lens unit U5, are increased, and hence it becomes difficult to satisfactorily suppress the aberrations.

On the other hand, when the imaging magnification falls below the lower limit value of the conditional expression (10), an entrance pupil position is located on the image side of a surface of the first lens unit U1 closest to the object side, and hence it becomes difficult to reduce the size and weight of the first lens unit.

In addition, it is more preferred to set the numerical value range of the conditional expression (10) as follows:

$$0.80 < \beta 5w < 2.70 \tag{10a}$$

It is preferred that the zoom lens according to the present invention satisfy the following conditional expression (11):

$$-3.0° < \theta < 3.0° \tag{11}$$

Note that, the conditional expression (11) defines an inclination θ (degrees) of the on-axis light beam passing through an air interval between the first sub lens unit U51 and the second sub lens unit U52 with respect to the optical axis at the wide angle end. It should be noted, however, that the inclination θ is positive for an angle of a divergent light beam with respect to the optical axis, and is negative for an angle of a convergent light beam with respect to the optical axis, and θ=0° when the system is afocal.

In this manner, both the attainment of good optical performance when the focal length conversion optical system FDC is mounted, and securement of a necessary and sufficient back focus may be realized.

When the inclination exceeds the upper limit value of the conditional expression (11), when the focal length conversion optical system FDC is mounted, the on-axis light beam enters the focal length conversion optical system FDC in a divergent manner, and refractive powers of respective lenses forming the focal length conversion optical system FDC become too strong, and hence it becomes difficult to satisfactorily suppress the aberrations.

On the other hand, when the inclination falls below the lower limit value of the conditional expression (11), a height of the on-axis light beam passing through the second sub lens unit U52 becomes low, and hence it becomes difficult to secure the necessary and sufficient back focus.

In addition, it is more preferred to set the numerical value range of the conditional expression (11) as follows:

$$-2.0° < \theta < 2.0° \tag{11a}$$

It is preferred that the zoom lens according to the present invention satisfy the following conditional expression (12):

$$0.50 < D/EA < 3.00 \tag{12}$$

Note that, the conditional expression (12) defines a ratio between an air interval D on the optical axis between the first sub lens unit U51 and the second sub lens unit U52 and a light beam effective diameter EA at the last lens surface of the first sub lens unit U51.

In this manner, both the attainment of the good optical performance when the focal length conversion optical system FDC is mounted, and making the total lens length of the focal length conversion optical system FDC compact may be realized.

When the ratio exceeds the upper limit value of the conditional expression (12), the air interval D becomes too long with respect to the light beam effective diameter EA, and hence it becomes difficult to make the total lens length of the focal length conversion optical system FDC compact. Moreover, the light beam effective diameter EA becomes too small with respect to the air interval D, and an entrance pupil diameter is reduced. Thus, it becomes difficult to secure a necessary and sufficient f-number.

On the other hand, when the ratio falls below the lower limit value of the conditional expression (12), the air interval D becomes too short with respect to the light beam effective diameter EA, and the powers of the respective lenses in the focal length conversion optical system FDC become too strong. Thus, it becomes difficult to satisfactorily suppress the aberrations. Moreover, the light beam effective diameter EA becomes too large with respect to the air interval D, and a lens diameter of the fifth lens unit U5 becomes large. Thus, it becomes difficult to attain the reductions in size and weight, and to obtain the good optical performance with a simple lens structure.

In addition, it is more preferred to set the numerical value range of the conditional expression (12) as follows:

$$0.70 < D/EA < 1.70 \tag{12a}$$

It is preferred that the zoom lens according to the present invention satisfy the following conditional expression (13):

$$7.00 < Z \tag{13}$$

Note that, the conditional expression (13) defines a zoom ratio Z of the zoom lens according to the present invention.

When the zoom ratio falls below the lower limit value of the conditional expression (13), the reductions in size and weight may be attained even with the related-art structures, and hence the effects of the present invention cannot be obtained.

It is preferred that the image pickup apparatus including the zoom lens according to the present invention satisfy the following conditional expression (14):

$$0.45 < fw/\phi \tag{14}$$

Note that, the conditional expression (14) defines a ratio between a focal length fw of the zoom lens at the wide angle end and a diagonal length φ of an image size of the image pickup element.

When the ratio falls below the lower limit value of the conditional expression (14), an angle of field at the wide angle end becomes excessively wide, and the lens diameter of the first lens unit U1 is disadvantageously determined on the wide angle side, with the result that the effects of the present invention cannot be obtained.

In addition, it is more preferred to set the numerical value range of the conditional expression (14) as follows:

$$0.50 < fw/\phi < 1.80 \tag{14a}$$

The zoom lens according to each of Numerical Examples 1 to 4 and the image pickup apparatus including the same satisfy all the conditional expressions (2) to (5) and (7) to (14). Moreover, the zoom lens according to each of Numerical Examples 5 to 7 and the image pickup apparatus including the same satisfy the conditional expressions (2) to (5), (7) to (10), (13), and (14).

Therefore, the zoom lens according to each of Numerical Examples 1 to 7 of the present invention attains the reductions in size and weight, and the high optical performance over the entire zoom range while having the wide angle of field and the high zoom ratio.

Moreover, in the zoom lens according to the present invention, it is preferred that the aperture stop SP and the lens unit on the image side of the aperture stop SP be configured not to move during zooming. In this manner, along with a change in focal length during zooming from the wide angle side to the telephoto side, the f-number may be kept constant to a point at which the f-number drops.

Further, as described above, it is preferred that the zoom lens according to the present invention include, in order from the object side to the image side, five lens units having positive, negative, positive, positive, and positive refractive powers.

Moreover, as described above, in the zoom lens according to the present invention, it is preferred that the aperture stop SP be arranged between the fourth lens unit U4 and the fifth lens unit U5. In this manner, along with the change in focal length during zooming from the wide angle side to the telephoto side, the f-number may be kept constant to the point at which the f-number drops.

In the following, numerical values of Numerical Examples 1 to 7 of the present invention are described. In each of Numerical Examples, surface number i denotes an order from the object side, symbol ri denotes a curvature radius of an i-th surface in order from the object side, and symbol di denotes a lens thickness or an air interval between the i-th surface and an (i+1)th surface in order from the object side. In addition, symbol ndi denotes a refractive index on the d-line of the material of an optical member arranged between the i-th surface and the (i+1)th surface in order from the object side, and symbol vdi denotes an Abbe number thereof on the d-line.

When the X-axis corresponds to the optical axis direction, the H-axis corresponds to the direction perpendicular to the optical axis, a light propagation direction is positive, symbol R denotes a paraxial curvature radius, symbol K denotes a conic constant, symbols A3, A4, A5, A6, A7, A8, A9, A10, A11, and A12 denote aspherical coefficients, respectively, and symbol X denotes displacement in the optical axis direction at a height H from the optical axis with a surface vertex being reference, an aspherical shape is expressed by the following equation.

$$X = \frac{H^2/R}{1+\sqrt{1-(1+k)(H/R)^2}} + A4H^4 + A6H^6 + A8H^8 + A10H^{10} + A12H^{12} + A3H^3 + A5H^5 + A7H^7 + A9H^9 + A11H^{11}$$

Moreover, the notation "e-Z" means "$10^{-z}$". The asterisk (*) mark indicates an aspherical surface. In each of Numerical Examples, the last two surfaces are surfaces of the glass block P. In each of Numerical Examples, a back focus (BF) corresponds to a distance from the last lens surface to a paraxial image plane, which is expressed by an air-equivalent length. The total lens length is a distance from a lens surface closest to the object side to the last lens surface plus the back focus. Moreover, correspondences with the above-mentioned conditional expressions (2) to (5) and (7) to (14) in each of Numerical Examples are shown in Table 1.

NUMERICAL EXAMPLE 1

Unit mm

Surface Data

| Surface number | r | d | nd | vd | Effective diameter | Focal length |
|---|---|---|---|---|---|---|
| 1 | 239.608 | 2.50 | 1.85478 | 24.8 | 77.68 | −206.81 |
| 2 | 101.786 | 12.26 | 1.43875 | 94.9 | 74.93 | 161.48 |
| 3 | −226.395 | 0.15 | 1 | | 74.88 | |
| 4 | 98.567 | 6.29 | 1.43387 | 95.1 | 72.93 | 376.95 |
| 5 | 242.366 | 0.15 | 1 | | 72.19 | |
| 6 | 68.331 | 8.00 | 1.76385 | 48.5 | 69.43 | 132.39 |
| 7 | 197.977 | (Variable) | 1 | | 68.35 | |
| 8* | 984.248 | 1.10 | 2.00330 | 28.3 | 30.42 | −21.57 |
| 9 | 21.338 | 6.53 | 1 | | 25.11 | |
| 10 | −40.310 | 4.71 | 1.95906 | 17.5 | 24.77 | 32.79 |
| 11 | −18.821 | 0.85 | 1.88300 | 40.8 | 24.79 | −17.56 |
| 12 | 92.930 | 0.19 | 1 | | 24.37 | |
| 13 | 41.546 | 2.56 | 1.71736 | 29.5 | 24.50 | 100.96 |
| 14 | 93.913 | (Variable) | 1 | | 24.21 | |
| 15 | 146.392 | 7.85 | 1.53775 | 74.7 | 30.25 | 41.48 |
| 16 | −25.922 | 1.00 | 1.84666 | 23.8 | 30.79 | −80.33 |
| 17 | −42.376 | (Variable) | 1 | | 32.13 | |
| 18 | −254.024 | 4.30 | 1.53775 | 74.7 | 34.32 | 102.97 |
| 19 | −45.853 | 0.15 | 1 | | 34.55 | |
| 20 | 40.689 | 5.12 | 1.59349 | 67.0 | 33.13 | 64.24 |
| 21* | −611.952 | (Variable) | 1 | | 32.45 | |
| 22 (Stop) | ∞ | 2.29 | 1 | | 21.70 | |
| 23 | −43.093 | 0.80 | 1.88300 | 40.8 | 20.95 | −17.13 |
| 24 | 23.717 | 3.03 | 1.85478 | 24.8 | 20.43 | 41.43 |
| 25 | 66.287 | 2.73 | 1 | | 20.27 | |
| 26 | −30.190 | 0.70 | 1.88300 | 40.8 | 20.28 | −35.09 |
| 27 | −976.326 | 1.55 | 1 | | 21.15 | |
| 28 | −52.527 | 1.50 | 1.72916 | 54.7 | 21.50 | −46.02 |
| 29 | 95.187 | 5.32 | 1.85478 | 24.8 | 23.42 | 23.55 |
| 30 | −25.173 | 30.00 | 1 | | 24.19 | |
| 31 | 167.099 | 4.33 | 1.48749 | 70.2 | 25.77 | 62.74 |
| 32 | −37.274 | 0.10 | 1 | | 25.95 | |
| 33 | −114.674 | 0.95 | 2.00100 | 29.1 | 25.63 | −27.95 |
| 34 | 37.554 | 5.22 | 1.53775 | 74.7 | 25.72 | 49.99 |
| 35 | −90.986 | 0.15 | 1 | | 26.24 | |
| 36 | 139.879 | 4.98 | 1.48749 | 70.2 | 26.66 | 63.65 |
| 37 | −39.580 | 0.95 | 1.85478 | 24.8 | 26.86 | −151.15 |
| 38 | −57.457 | 0.20 | 1 | | 27.22 | |
| 39 | 50.127 | 4.00 | 1.50137 | 56.4 | 27.20 | 74.73 |

-continued

| Unit mm | | | | | |
|---|---|---|---|---|---|
| 40 | −146.813 | 4.50 | 1 | | 26.91 |
| 41 | ∞ | 33.00 | 1.60859 | 46.4 | 40.00 |
| 42 | ∞ | 13.20 | 1.51633 | 64.1 | 40.00 |
| 43 | ∞ | | 1 | | 40.00 |
| Image plane | ∞ | | | | |

Aspherical surface data

Eighth surface

| K = −4.41172e+003 | A4 = 4.26158e−006 | A6 = 3.79089e−007 | A8 = −4.97228e−010 |
|---|---|---|---|
| A10 = 7.91081e−012 | A12 = 2.01053e−014 | | |
| A5 = −2.00546e−006 | A7 = −2.54263e−008 | A9 = 6.85374e−011 | A11= −8.33665e−013 |

Twenty-first surface

| K = −4.29923e+001 | A4 = 1.03032e−006 | A6 = −3.65553e−008 | A8 = 3.24828e−010 |
|---|---|---|---|
| A10 = −7.31549e−012 | A12 = −7.53488e−015 | | |
| A5 = 3.04736e−007 | A7 = −1.41735e−009 | A9 = 3.41917e−011 | A11 = 4.05675e−013 |

Various data

| Zoom ratio | | 21.50 | |
|---|---|---|---|
| | Wide angle | Intermediate | Telephoto |
| Focal length | 7.90 | 36.63 | 169.86 |
| F-number | 1.80 | 1.80 | 2.30 |
| Half angle of field | 34.85 | 8.54 | 1.85 |
| Image height | 5.50 | 5.50 | 5.50 |
| Total lens length | 280.86 | 280.86 | 280.86 |
| BF | 6.98 | 6.98 | 6.98 |
| d7 | 2.41 | 39.61 | 55.20 |
| d14 | 86.24 | 40.76 | 1.50 |
| d17 | 1.00 | 2.61 | 17.50 |
| d21 | 1.00 | 7.67 | 16.45 |

Variable focus adjustment interval Close range
(0.9 m from surface of first lens unit closest to object side)

| d14 | 86.74 | 43.25 | 18.50 |
|---|---|---|---|
| d17 | 0.50 | 0.13 | 0.50 |
| Entrance pupil position | 46.56 | 227.76 | 853.19 |
| Exit pupil position | 136.10 | 136.10 | 136.10 |
| Front principal point position | 54.94 | 274.78 | 1,246.52 |
| Rear principal point position | −0.92 | −29.65 | −162.88 |

Zoom lens unit data

| Unit | First surface | Focal length | Lens structure length | Front principal point position | Rear principal point position |
|---|---|---|---|---|---|
| 1 | 1 | 87.00 | 29.36 | 10.77 | −8.22 |
| 2 | 8 | −14.00 | 15.95 | 2.30 | −8.74 |
| 3 | 15 | 86.00 | 8.85 | 4.50 | −1.23 |
| 4 | 18 | 39.50 | 9.57 | 3.22 | −2.92 |
| 5 | 22 | ∞ | 0.00 | 0.00 | 0.00 |
| 6 | 23 | −34.08 | 15.64 | −5.13 | −19.91 |
| 7 | 31 | 43.37 | 71.58 | 11.13 | −36.41 |

NUMERICAL EXAMPLE 2

| Unit mm | | | | | | |
|---|---|---|---|---|---|---|
| Surface data | | | | | | |
| Surface number | r | d | nd | vd | Effective diameter | Focal length |
| 1 | 314.812 | 2.40 | 1.85478 | 24.8 | 78.08 | −247.95 |
| 2 | 126.932 | 9.31 | 1.43875 | 94.9 | 77.09 | 236.60 |
| 3 | 564.815 | 0.15 | 1 | | 77.03 | |
| 4 | 129.724 | 6.43 | 1.43387 | 95.1 | 76.30 | 388.20 |
| 5 | 551.381 | 0.15 | 1 | | 75.79 | |
| 6 | 86.938 | 7.86 | 1.43387 | 95.1 | 73.64 | 284.20 |
| 7 | 284.995 | 0.15 | 1 | | 72.66 | |
| 8 | 88.593 | 5.29 | 1.76385 | 48.5 | 69.71 | 224.84 |
| 9 | 177.318 | (Variable) | 1 | | 68.65 | |
| 10* | 652.366 | 1.20 | 1.88300 | 40.8 | 31.99 | −21.79 |
| 11 | 18.779 | 7.52 | 1 | | 25.34 | |
| 12 | −38.256 | 4.07 | 1.95906 | 17.5 | 25.02 | 42.75 |
| 13 | −20.963 | 0.90 | 1.88300 | 40.8 | 25.11 | −19.24 |
| 14 | 94.404 | 0.20 | 1 | | 25.02 | |
| 15 | 44.743 | 3.15 | 1.64769 | 33.8 | 25.28 | 75.64 |
| 16 | 467.608 | (Variable) | 1 | | 25.12 | |
| 17 | 90.985 | 0.80 | 1.84666 | 23.8 | 29.99 | −75.80 |
| 18 | 37.695 | 6.44 | 1.61800 | 63.3 | 30.30 | 39.98 |
| 19 | −67.779 | (Variable) | 1 | | 30.69 | |
| 20 | 169.336 | 4.93 | 1.49700 | 81.5 | 32.61 | 80.19 |
| 21 | −51.811 | 0.90 | 1.84666 | 23.8 | 32.65 | −98.97 |
| 22 | −134.692 | 0.15 | 1 | | 33.02 | |
| 23 | 53.547 | 6.03 | 1.76385 | 48.5 | 33.27 | 38.97 |
| 24* | −64.466 | (Variable) | 1 | | 32.91 | |
| 25 (Stop) | ∞ | 2.03 | 1 | | 22.06 | |
| 26 | −55.106 | 0.81 | 1.88300 | 40.8 | 21.22 | −15.32 |
| 27 | 18.193 | 3.54 | 1.80810 | 22.8 | 20.18 | 33.48 |
| 28 | 49.640 | 3.14 | 1 | | 19.93 | |
| 29 | −26.643 | 0.71 | 1.88300 | 40.8 | 19.93 | −29.88 |
| 30 | 6573.468 | 1.34 | 1 | | 20.95 | |
| 31 | −69.093 | 1.00 | 1.72916 | 54.7 | 21.33 | −56.95 |
| 32 | 105.859 | 5.32 | 1.85478 | 24.8 | 22.72 | 23.88 |
| 33 | −24.986 | 30.00 | 1 | | 23.60 | |
| 34 | 183.125 | 4.50 | 1.48749 | 70.2 | 26.53 | 62.88 |
| 35 | −36.671 | 0.10 | 1 | | 26.72 | |
| 36 | −168.481 | 0.95 | 2.00100 | 29.1 | 26.33 | −30.44 |
| 37 | 37.670 | 5.50 | 1.53775 | 74.7 | 26.28 | 48.04 |
| 38 | −78.788 | 0.15 | 1 | | 26.70 | |
| 39 | 155.109 | 5.04 | 1.48749 | 70.2 | 26.98 | 63.64 |
| 40 | −38.532 | 0.95 | 1.85478 | 24.8 | 27.06 | −133.62 |
| 41 | −58.533 | 0.20 | 1 | | 27.38 | |
| 42 | 60.460 | 3.61 | 1.50137 | 56.4 | 27.11 | 87.12 |
| 43 | −156.592 | 4.50 | 1 | | 26.81 | |
| 44 | ∞ | 33.00 | 1.60859 | 46.4 | 40.00 | |
| 45 | ∞ | 13.20 | 1.51633 | 64.1 | 40.00 | |
| 46 | ∞ | | 1 | | 40.00 | |
| Image plane | ∞ | | | | | |

Aspherical surface data

Tenth surface

K = 7.88000e+002  A4 = 4.61005e−006  A6 = 2.26962e−007  A8 = −1.84642e−010
A10 = 4.94887e−012  A12 = 1.45913e−014
A5 = −1.19913e−006  A7 = −1.77695e−008  A9 = 4.99648e−011  A11 = −5.81725e−013

Twenty-fourth surface

K = 1.35231e+000  A4 = 5.25407e−006  A6 = 6.14230e−010  A8 = 2.91051e−010
A10 = −7.07785e−012  A12 = −8.23965e−015
A5 = −9.74946e−008  A7 = −2.12191e−009  A9 = 2.97475e−011  A11 = 4.20444e−013

Various data
Zoom ratio 21.50

| | Wide angle | Intermediate | Telephoto |
|---|---|---|---|
| Focal length | 7.90 | 36.07 | 169.87 |
| F-number | 1.80 | 1.80 | 2.25 |
| Half angle of field | 34.85 | 8.67 | 1.85 |
| Image height | 5.50 | 5.50 | 5.50 |
| Total lens length | 285.03 | 285.03 | 285.03 |
| BF | 6.79 | 6.79 | 6.79 |

| Unit mm | | | |
|---|---|---|---|
| d9 | 1.46 | 41.69 | 60.62 |
| d16 | 89.54 | 39.57 | 1.50 |
| d19 | 1.41 | 5.20 | 18.54 |
| d24 | 0.50 | 6.45 | 12.25 |

Variable focus adjustment interval Close range
(0.9 m from surface of first lens unit closest to object side)

| | | | |
|---|---|---|---|
| d16 | 90.13 | 41.96 | 19.54 |
| d19 | 0.83 | 2.81 | 0.50 |
| Entrance pupil position | 48.15 | 230.02 | 909.79 |
| Exit pupil position | 132.91 | 132.91 | 132.91 |
| Front principal point position | 56.55 | 276.40 | 1,308.45 |
| Rear principal point position | −1.11 | −29.27 | −163.07 |

Zoom lens unit data

| Unit | First surface | Focal length | Lens structure length | Front principal point position | Rear principal point position |
|---|---|---|---|---|---|
| 1 | 1 | 95.00 | 31.74 | 11.43 | −9.73 |
| 2 | 10 | −14.68 | 17.05 | 2.28 | −10.10 |
| 3 | 17 | 82.00 | 7.24 | 3.09 | −1.37 |
| 4 | 20 | 36.00 | 12.01 | 5.14 | −2.34 |
| 5 | 25 | ∞ | 0.00 | 0.00 | 0.00 |
| 6 | 26 | −30.21 | 15.86 | −3.64 | −18.06 |
| 7 | 34 | 42.55 | 69.40 | 10.55 | −35.77 |

NUMERICAL EXAMPLE 3

| Unit mm | | | | | |
|---|---|---|---|---|---|
| Surface data | | | | | |
| Surface number | r | d | nd | vd | Effective diameter | Focal length |
|---|---|---|---|---|---|---|
| 1 | 266.376 | 2.30 | 1.85478 | 24.8 | 72.43 | −162.75 |
| 2 | 91.587 | 10.85 | 1.43875 | 94.9 | 67.94 | 153.91 |
| 3 | −250.162 | 0.15 | 1 | | 67.98 | |
| 4 | 132.375 | 6.12 | 1.53775 | 74.7 | 67.35 | 259.76 |
| 5 | 2353.073 | 0.15 | 1 | | 66.86 | |
| 6 | 55.532 | 8.58 | 1.76385 | 48.5 | 63.32 | 103.49 |
| 7 | 172.160 | (Variable) | 1 | | 62.16 | |
| 8* | 219.132 | 1.10 | 2.00330 | 28.3 | 29.40 | −19.57 |
| 9 | 18.111 | 7.04 | 1 | | 23.55 | |
| 10 | −31.846 | 4.43 | 1.95906 | 17.5 | 23.20 | 32.90 |
| 11 | −17.048 | 0.85 | 1.88300 | 40.8 | 23.34 | −17.29 |
| 12 | 158.627 | 0.19 | 1 | | 23.29 | |
| 13 | 43.991 | 2.61 | 1.71736 | 29.5 | 23.45 | 88.02 |
| 14 | 138.907 | (Variable) | 1 | | 23.20 | |
| 15 | 153.501 | 7.38 | 1.53775 | 74.7 | 28.32 | 39.61 |
| 16 | −24.404 | 1.00 | 1.84666 | 23.8 | 28.88 | −72.55 |
| 17 | −40.992 | (Variable) | 1 | | 30.19 | |
| 18 | −57.644 | 3.52 | 1.53775 | 74.7 | 32.60 | 141.34 |
| 19 | −33.528 | 0.15 | 1 | | 33.10 | |
| 20 | 40.056 | 5.26 | 1.59349 | 67.0 | 32.40 | 58.10 |
| 21* | −241.935 | (Variable) | 1 | | 31.83 | |
| 22 (Stop) | ∞ | 2.39 | 1 | | 20.99 | |
| 23 | −37.828 | 0.80 | 1.88300 | 40.8 | 20.34 | −15.53 |
| 24 | 21.931 | 2.87 | 1.85478 | 24.8 | 20.12 | 44.93 |
| 25 | 47.430 | 2.77 | 1 | | 20.06 | |
| 26 | −34.493 | 0.70 | 1.88300 | 40.8 | 20.13 | −32.75 |
| 27 | 187.429 | 0.60 | 1 | | 21.26 | |
| 28 | 290.390 | 1.50 | 1.72916 | 54.7 | 21.79 | −84.15 |
| 29 | 50.724 | 5.50 | 1.85478 | 24.8 | 23.18 | 21.63 |
| 30 | −28.044 | 31.98 | 1 | | 23.85 | |
| 31 | −198.308 | 3.86 | 1.48749 | 70.2 | 25.81 | 77.60 |
| 32 | −32.064 | 0.10 | 1 | | 26.14 | |
| 33 | −83.958 | 0.95 | 2.00100 | 29.1 | 25.94 | −33.64 |
| 34 | 57.312 | 5.26 | 1.53775 | 74.7 | 26.31 | 51.88 |
| 35 | −52.945 | 0.15 | 1 | | 26.89 | |
| 36 | 149.683 | 6.13 | 1.48749 | 70.2 | 27.29 | 49.54 |
| 37 | −28.522 | 0.95 | 1.85478 | 24.8 | 27.39 | −100.35 |

-continued

| Unit mm | | | | | | |
|---|---|---|---|---|---|---|
| 38 | −43.188 | 0.20 | 1 | | 27.92 | |
| 39 | 42.319 | 3.39 | 1.50137 | 56.4 | 27.37 | 102.03 |
| 40 | 233.785 | 4.50 | 1 | | 26.92 | |
| 41 | ∞ | 33.00 | 1.60859 | 46.4 | 40.00 | |
| 42 | ∞ | 13.20 | 1.51633 | 64.1 | 40.00 | |
| 43 | ∞ | | 1 | | 40.00 | |
| Image plane | ∞ | | | | | |

Aspherical surface data

Eighth surface

K = −1.90690e+002   A4 = 5.00676e−006   A6 = 3.80845e−007   A8 = −4.99584e−010
A10 = 7.93270e−012   A12 = 2.02661e−014
A5 = −1.97362e−006   A7 = −2.59154e−008   A9 = 6.90134e−011   A11 = −8.37124e−013

Twenty-first surface

K = −5.82460e+001   A4 = 1.94641e−006   A6 = −4.20053e−008   A8 = 2.53459e−010
A10 = −7.27365e−012   A12 = −7.91843e−015
A5 = 2.77199e−007   A7 = −1.37472e−010   A9 = 3.37305e−011   A11 = 4.15007e−013

Various data
Zoom ratio 17.00

| | Wide angle | Intermediate | Telephoto |
|---|---|---|---|
| Focal length | 7.80 | 32.16 | 132.59 |
| F-number | 1.80 | 1.80 | 2.11 |
| Half angle of field | 35.19 | 9.71 | 2.38 |
| Image height | 5.50 | 5.50 | 5.50 |
| Total lens length | 268.73 | 268.73 | 268.73 |
| BF | 6.98 | 6.98 | 6.98 |
| d 7 | 1.27 | 29.77 | 42.04 |
| d14 | 75.87 | 37.21 | 1.50 |
| d17 | 1.12 | 4.07 | 15.97 |
| d21 | 1.00 | 8.22 | 19.75 |

Variable focus adjustment interval Close range
(0.6 m from surface of first lens unit closest to object side)

| | | | |
|---|---|---|---|
| d14 | 76.49 | 40.15 | 16.97 |
| d17 | 0.50 | 1.13 | 0.50 |
| Entrance pupil position | 42.53 | 178.41 | 587.03 |
| Exit pupil position | 122.00 | 122.00 | 122.00 |
| Front principal point position | 50.86 | 219.56 | 872.48 |
| Rear principal point position | −0.82 | −25.17 | −125.61 |

Zoom lens unit data

| Unit | First surface | Focal length | Lens structure length | Front principal point position | Rear principal point position |
|---|---|---|---|---|---|
| 1 | 1 | 71.85 | 28.15 | 10.58 | −7.14 |
| 2 | 8 | −13.14 | 16.21 | 2.09 | −9.49 |
| 3 | 15 | 87.63 | 8.38 | 4.38 | −1.04 |
| 4 | 18 | 40.69 | 8.93 | 3.51 | −2.16 |
| 5 | 22 | ∞ | 0.00 | 0.00 | 0.00 |
| 6 | 23 | −38.42 | 14.74 | −6.42 | −20.19 |
| 7 | 31 | 42.91 | 71.69 | 11.24 | −35.95 |

NUMERICAL EXAMPLE 4

| Unit mm | | | | | | |
|---|---|---|---|---|---|---|
| Surface data | | | | | | |
| Surface number | r | d | nd | vd | Effective diameter | Focal length |
| 1 | 1064.661 | 3.00 | 1.83481 | 42.7 | 104.30 | −165.16 |
| 2 | 122.514 | 0.81 | 1 | | 96.75 | |
| 3 | 122.051 | 16.19 | 1.43387 | 95.1 | 97.41 | 216.29 |
| 4 | −393.964 | 1.29 | 1 | | 97.85 | |
| 5 | 139.447 | 13.45 | 1.43387 | 95.1 | 99.23 | 279.41 |

-continued

| | | Unit mm | | | | |
|---|---|---|---|---|---|---|
| 6 | −918.309 | 0.13 | 1 | | 98.76 | |
| 7 | 111.372 | 13.96 | 1.43387 | 95.1 | 95.39 | 276.95 |
| 8 | 1419.487 | 0.13 | 1 | | 93.50 | |
| 9 | 101.805 | 8.74 | 1.49700 | 81.5 | 87.65 | 369.69 |
| 10 | 220.980 | (Variable) | 1 | | 85.52 | |
| 11 | 130.495 | 1.00 | 1.88300 | 40.8 | 31.99 | −37.39 |
| 12 | 26.374 | 7.28 | 1 | | 27.66 | |
| 13 | −33.629 | 0.90 | 1.81600 | 46.6 | 27.16 | −23.85 |
| 14 | 47.302 | 0.20 | 1 | | 26.93 | |
| 15 | 47.566 | 4.57 | 1.92286 | 18.9 | 27.02 | 38.95 |
| 16 | −147.765 | 0.57 | 1 | | 26.88 | |
| 17 | −91.945 | 0.90 | 1.81600 | 46.6 | 26.82 | −120.65 |
| 18* | −1304.504 | (Variable) | 1 | | 26.75 | |
| 19 | 65.036 | 1.00 | 1.84666 | 23.8 | 36.42 | −79.31 |
| 20 | 32.962 | 8.76 | 1.61800 | 63.3 | 36.28 | 40.28 |
| 21 | −92.723 | (Variable) | 1 | | 36.51 | |
| 22 | −59.739 | 2.39 | 1.60311 | 60.6 | 36.52 | 165.64 |
| 23 | −38.238 | 1.00 | 1.83400 | 37.2 | 36.88 | −64.45 |
| 24 | −132.024 | 0.15 | 1 | | 38.37 | |
| 25 | 91.364 | 7.41 | 1.76385 | 48.5 | 39.82 | 43.16 |
| 26* | −50.140 | (Variable) | 1 | | 39.84 | |
| 27 (Stop) | ∞ | 3.51 | 1 | | 26.23 | |
| 28 | −68.397 | 0.80 | 1.88300 | 40.8 | 24.92 | −23.37 |
| 29 | 29.967 | 4.21 | 1.85478 | 24.8 | 24.46 | 33.42 |
| 30 | −715.014 | 1.07 | 1 | | 24.33 | |
| 31 | −76.051 | 0.70 | 1.88300 | 40.8 | 24.29 | −57.46 |
| 32 | 155.838 | 3.16 | 1 | | 24.39 | |
| 33 | −35.540 | 1.50 | 1.72916 | 54.7 | 24.51 | −80.42 |
| 34 | −91.227 | 3.18 | 1.85478 | 24.8 | 25.72 | 53.56 |
| 35 | −31.173 | 40.00 | 1 | | 26.24 | |
| 36 | 221.901 | 3.43 | 1.48749 | 70.2 | 27.07 | 98.30 |
| 37 | −61.070 | 0.10 | 1 | | 27.03 | |
| 38 | 84.394 | 0.95 | 2.00100 | 29.1 | 26.32 | −58.41 |
| 39 | 34.509 | 5.56 | 1.53775 | 74.7 | 25.62 | 44.40 |
| 40 | −73.891 | 0.15 | 1 | | 25.33 | |
| 41 | 112.652 | 3.04 | 1.48749 | 70.2 | 24.53 | 146.70 |
| 42 | −195.930 | 0.95 | 1.85478 | 24.8 | 23.96 | −110.84 |
| 43 | 187.267 | 0.20 | 1 | | 23.74 | |
| 44 | 30.170 | 2.37 | 1.50137 | 56.4 | 23.45 | 176.57 |
| 45 | 44.467 | 4.50 | 1 | | 22.90 | |
| 46 | ∞ | 33.00 | 1.60859 | 46.4 | 40.00 | |
| 47 | ∞ | 13.20 | 1.51633 | 64.1 | 40.00 | |
| 48 | ∞ | | 1 | | 40.00 | |
| Image plane | ∞ | | | | | |

Aspherical surface data

Eighteenth surface

K = 7.87727e+003   A4 = −1.18524e−006   A6 = 1.49038e−008   A8 = −5.90477e−011
A10 = −4.17580e−014   A12 = 3.71533e−016
A5 = −2.39884e−008   A7 = 1.32384e−011   A9 = 9.70063e−013   A11 = 3.08551e−015

Twenty-sixth surface

K = −2.94863e+000   A4 = 2.04217e−007   A6 = −8.67575e−010   A8 = 2.51063e−012
A10 = −5.92815e−015   A12 = 5.85887e−018
A5 = −1.26325e−008   A7 = 5.75185e−011   A9 = −1.18866e−013   A11 = 9.73869e−017

Various data
Zoom ratio 30.00

| | Wide angle | Intermediate | Telephoto |
|---|---|---|---|
| Focal length | 10.00 | 54.72 | 300.01 |
| F-number | 2.00 | 2.00 | 3.16 |
| Half angle of field | 28.81 | 5.74 | 1.05 |
| Image height | 5.50 | 5.50 | 5.50 |
| Total lens length | 356.79 | 356.79 | 356.79 |
| BF | 10.50 | 10.50 | 10.50 |
| d10 | 2.87 | 54.60 | 75.02 |
| d18 | 117.27 | 54.97 | 1.50 |
| d21 | 5.19 | 3.55 | 33.32 |
| d26 | 0.58 | 12.79 | 16.06 |

| Unit mm | | | |
|---|---|---|---|
| Variable focus adjustment interval Close range (2.8 m from surface of first lens unit closest to object side) | | | |
| d18 | 118.33 | 57.02 | 29.23 |
| d21 | 4.12 | 1.49 | 5.59 |
| Entrance pupil position | 77.58 | 375.22 | 1,927.28 |
| Exit pupil position | 450.35 | 450.35 | 450.35 |
| Front principal point position | 87.80 | 436.75 | 2,431.93 |
| Rear principal point position | 0.50 | −44.22 | −289.52 |

| Zoom lens unit data | | | | | |
|---|---|---|---|---|---|
| Unit | First surface | Focal length | Lens structure length | Front principal point position | Rear principal point position |
| 1 | 1 | 115.00 | 57.70 | 26.53 | −12.59 |
| 2 | 11 | −18.00 | 15.42 | 3.86 | −7.41 |
| 3 | 19 | 80.00 | 9.76 | 2.88 | −3.19 |
| 4 | 22 | 68.00 | 11.94 | 9.04 | 2.49 |
| 5 | 27 | ∞ | 0.00 | 0.00 | 0.00 |
| 6 | 28 | −48.92 | 14.63 | −3.12 | −14.72 |
| 7 | 36 | 52.09 | 67.44 | 3.17 | −41.37 |

NUMERICAL EXAMPLE 5

| Unit mm | | | | | | |
|---|---|---|---|---|---|---|
| Surface data | | | | | | |
| Surface number | r | d | nd | vd | Effective diameter | Focal length |
| 1 | 237.307 | 5.35 | 1.77250 | 49.6 | 171.77 | −202.01 |
| 2 | 93.487 | 44.39 | 1 | | 142.20 | |
| 3 | −241.133 | 4.40 | 1.72916 | 54.7 | 141.44 | −198.22 |
| 4 | 367.570 | 0.20 | 1 | | 138.64 | |
| 5 | 277.012 | 10.11 | 1.80518 | 25.4 | 138.77 | 495.00 |
| 6 | 875.140 | 22.05 | 1 | | 137.97 | |
| 7 | 2130.689 | 17.17 | 1.43387 | 95.1 | 133.21 | 370.82 |
| 8 | −174.077 | 0.20 | 1 | | 132.66 | |
| 9 | 423.743 | 23.58 | 1.53775 | 74.7 | 130.22 | 203.26 |
| 10 | −145.052 | 4.20 | 1.72047 | 34.7 | 130.69 | −176.73 |
| 11 | 1116.931 | 0.20 | 1 | | 136.00 | |
| 12 | 741.225 | 20.12 | 1.43387 | 95.1 | 136.67 | 329.77 |
| 13 | −176.393 | 0.20 | 1 | | 137.57 | |
| 14 | 359.349 | 19.88 | 1.43387 | 95.1 | 139.00 | 357.13 |
| 15 | −269.023 | 0.20 | 1 | | 138.71 | |
| 16 | 156.015 | 12.45 | 1.62041 | 60.3 | 130.51 | 346.43 |
| 17 | 546.013 | (Variable) | 1 | | 129.39 | |
| 18* | 434.914 | 2.50 | 1.77250 | 49.6 | 58.51 | −80.60 |
| 19 | 54.557 | 0.56 | 1 | | 50.92 | |
| 20 | 49.605 | 10.68 | 1.80810 | 22.8 | 49.95 | 46.71 |
| 21 | −148.985 | 1.50 | 1.72916 | 54.7 | 47.83 | −41.27 |
| 22 | 38.075 | 10.06 | 1 | | 37.99 | |
| 23 | −44.001 | 1.50 | 1.88300 | 40.8 | 36.92 | −48.43 |
| 24 | 1940.816 | (Variable) | 1 | | 36.74 | |
| 25 | 117.723 | 9.84 | 1.60311 | 60.6 | 48.53 | 87.03 |
| 26 | −92.388 | 0.15 | 1 | | 49.04 | |
| 27 | 136.197 | 7.41 | 1.45600 | 90.3 | 48.31 | 131.07 |
| 28 | −105.180 | 0.51 | 1 | | 47.80 | |
| 29 | −89.627 | 1.90 | 1.80518 | 25.4 | 47.79 | −81.05 |
| 30 | 250.781 | 2.74 | 1.49700 | 81.5 | 47.62 | 771.64 |
| 31 | 718.046 | (Variable) | 1 | | 47.63 | |
| 32* | 80.939 | 9.50 | 1.60311 | 60.6 | 48.52 | 72.00 |
| 33 | −90.302 | (Variable) | 1 | | 48.07 | |
| 34 (Stop) | ∞ | (Variable) | 1 | | 29.99 | |
| 35 | −93.499 | 1.50 | 1.75500 | 52.3 | 29.36 | −23.63 |
| 36 | 22.329 | 5.29 | 1.80810 | 22.8 | 27.87 | 41.11 |
| 37 | 59.615 | 5.06 | 1 | | 27.39 | |
| 38 | −39.063 | 1.50 | 1.77250 | 49.6 | 27.33 | −29.58 |
| 39 | 56.642 | 9.29 | 1.60342 | 38.0 | 29.04 | 37.76 |
| 40 | −36.134 | 17.92 | 1 | | 30.58 | |
| 41 | −49.073 | 1.60 | 1.81600 | 46.6 | 31.84 | −51.67 |
| 42 | 314.991 | 12.48 | 1.60342 | 38.0 | 33.44 | 113.96 |

-continued

| Unit mm | | | | | | |
|---|---|---|---|---|---|---|
| 43 | −87.344 | 19.04 | 1 | | 37.48 | |
| 44 | 75.610 | 8.87 | 1.56732 | 42.8 | 46.96 | 73.28 |
| 45 | −89.507 | 0.20 | 1 | | 46.94 | |
| 46 | 186.174 | 2.00 | 1.88300 | 40.8 | 45.38 | −60.50 |
| 47 | 41.486 | 10.55 | 1.49700 | 81.5 | 43.42 | 60.06 |
| 48 | −98.459 | 0.20 | 1 | | 43.30 | |
| 49 | 108.386 | 9.61 | 1.48749 | 70.2 | 41.81 | 61.86 |
| 50 | −40.753 | 2.00 | 1.72151 | 29.2 | 41.12 | −59.72 |
| 51 | −673.813 | 0.20 | 1 | | 40.25 | |
| 52 | 84.227 | 6.08 | 1.48749 | 70.2 | 39.53 | 98.67 |
| 53 | −110.345 | 13.04 | 1 | | 38.87 | |
| 54 | ∞ | 33.00 | 1.60859 | 46.4 | 60.00 | |
| 55 | ∞ | 13.20 | 1.51633 | 64.1 | 60.00 | |
| 56 | ∞ | | 1 | | 60.00 | |
| Image plane | ∞ | | | | | |

Aspherical surface data

Eighteenth surface $K = -1.78715e+002$  $A4 = 3.11384e-007$  $A6 = -1.19960e-009$  $A8 = 8.07630e-013$
$A10 = 8.60767e-016$  $A12 = -2.28625e-018$
$A3 = -1.93382e-007$  $A5 = 4.00433e-008$  $A7 = -3.77389e-012$  $A9 = -6.10470e-014$
$A11 = 9.09713e-017$

Thirty-second surface $K = -4.12051e+000$  $A4 = -5.58736e-007$  $A6 = -2.69989e-009$  $A8 = -1.49871e-012$
$A10 = 4.41708e-016$  $A12 = -1.07879e-018$
$A3 = 7.47629e-007$  $A5 = 4.72366e-008$  $A7 = 2.56546e-011$  $A9 = 9.46078e-014$
$A11 = -2.21414e-017$

Various data
Zoom ratio 27.09

| | Wide angle | Intermediate | Telephoto |
|---|---|---|---|
| Focal length | 6.50 | 33.88 | 176.07 |
| F-number | 1.50 | 1.50 | 2.20 |
| Half angle of field | 40.24 | 9.22 | 1.79 |
| Image height | 5.50 | 5.50 | 5.50 |
| Total lens length | 618.47 | 618.47 | 618.47 |
| BF | 11.83 | 11.83 | 11.83 |
| d17 | 1.00 | 82.15 | 117.09 |
| d24 | 167.48 | 72.09 | 3.33 |
| d31 | 19.32 | 16.76 | 32.50 |
| d33 | 0.50 | 17.31 | 35.38 |

Variable focus adjustment interval Close range
(0.6 m from surface of first lens unit closest to object side)

| | | | |
|---|---|---|---|
| D24 | 169.57 | 76.35 | 35.59 |
| D31 | 17.24 | 12.50 | 0.25 |
| Entrance pupil position | 104.13 | 246.79 | 957.19 |
| Exit pupil position | 76.13 | 76.13 | 76.13 |
| Front principal point position | 111.29 | 298.51 | 1,615.37 |
| Rear principal point position | 5.33 | −22.05 | −164.25 |

Zoom lens unit data

| Unit | First surface | Focal length | Lens structure length | Front principal point position | Rear principal point position |
|---|---|---|---|---|---|
| 1 | 1 | 110.00 | 184.70 | 123.01 | 63.18 |
| 2 | 18 | −26.89 | 26.80 | 15.24 | −3.96 |
| 3 | 25 | 112.00 | 22.55 | −2.33 | −16.38 |
| 4 | 32 | 72.00 | 9.50 | 2.86 | −3.19 |
| 5 | 34 | ∞ | 0.00 | 0.00 | 0.00 |
| 6 | 35 | 27.71 | 172.62 | 45.13 | 9.23 |

NUMERICAL EXAMPLE 6

| | | | Unit mm | | | |
|---|---|---|---|---|---|---|
| | | | Surface data | | | |
| Surface number | r | d | nd | vd | Effective diameter | Focal length |
| 1 | 361.905 | 13.89 | 1.43387 | 95.1 | 142.87 | 544.92 |
| 2 | −678.848 | 0.20 | 1 | | 142.50 | |
| 3 | −2913.613 | 4.50 | 1.72916 | 54.7 | 141.67 | −194.92 |
| 4 | 150.200 | 0.61 | 1 | | 138.68 | |
| 5 | 148.805 | 23.37 | 1.43387 | 95.1 | 139.23 | 290.54 |
| 6 | −798.404 | 0.20 | 1 | | 139.37 | |
| 7 | 163.454 | 17.89 | 1.43387 | 95.1 | 139.18 | 396.80 |
| 8 | 2984.731 | 0.20 | 1 | | 138.29 | |
| 9 | 186.051 | 13.05 | 1.43387 | 95.1 | 133.65 | 588.73 |
| 10 | 665.921 | (Variable) | 1 | | 131.68 | |
| 11* | 332.319 | 1.50 | 1.53775 | 74.7 | 44.00 | −92.82 |
| 12 | 43.446 | 7.67 | 1 | | 39.11 | |
| 13 | −69.045 | 1.50 | 1.49700 | 81.5 | 38.87 | −64.62 |
| 14 | 60.820 | 8.56 | 1 | | 36.17 | |
| 15 | −33.428 | 1.50 | 1.49700 | 81.5 | 36.02 | −52.88 |
| 16 | 126.505 | 0.20 | 1 | | 38.05 | |
| 17 | 78.259 | 5.85 | 1.65412 | 39.7 | 38.70 | 62.79 |
| 18* | −84.938 | (Variable) | 1 | | 38.87 | |
| 19 | 84.351 | 7.30 | 1.53775 | 74.7 | 38.53 | 67.61 |
| 20 | −62.316 | 1.04 | 1 | | 38.59 | |
| 21 | −61.641 | 1.50 | 1.72047 | 34.7 | 38.26 | −119.19 |
| 22 | −216.934 | 0.20 | 1 | | 38.61 | |
| 23* | 229.595 | 2.35 | 1.53775 | 74.7 | 38.68 | 760.40 |
| 24 | 519.577 | (Variable) | 1 | | 38.64 | |
| 25 | 53.857 | 8.65 | 1.53775 | 74.7 | 39.06 | 60.13 |
| 26 | −76.980 | 0.20 | 1 | | 38.40 | |
| 27* | −240.227 | 1.50 | 1.75500 | 52.3 | 37.09 | −58.52 |
| 28 | 54.589 | 5.46 | 1.49700 | 81.5 | 35.50 | 94.07 |
| 29 | −321.353 | (Variable) | 1 | | 35.04 | |
| 30 (Stop) | ∞ | 2.50 | 1 | | 25.40 | |
| 31 | 114.968 | 1.50 | 1.88300 | 40.8 | 23.90 | −45.97 |
| 32 | 29.943 | 4.71 | 1.59270 | 35.3 | 22.81 | 39.14 |
| 33 | −99.856 | 8.70 | 1 | | 22.32 | |
| 34 | −513.603 | 1.50 | 1.88300 | 40.8 | 16.93 | −23.86 |
| 35 | 22.129 | 3.05 | 1.59270 | 35.3 | 16.69 | 48.72 |
| 36 | 87.906 | (Variable) | 1 | | 16.80 | |
| 37 | −60.441 | 1.50 | 1.88300 | 40.8 | 21.21 | −22.13 |
| 38 | 29.467 | 3.56 | 1.75520 | 27.5 | 22.52 | 52.12 |
| 39 | 108.354 | 0.30 | 1 | | 23.24 | |
| 40 | 51.210 | 6.25 | 1.66680 | 33.1 | 24.25 | 29.25 |
| 41 | −30.298 | 1.50 | 1.83481 | 42.7 | 24.84 | −58.42 |
| 42 | −81.071 | (Variable) | 1 | | 25.86 | |
| 43 | 106.817 | 6.83 | 1.51633 | 64.1 | 27.60 | 51.77 |
| 44 | −35.047 | 1.50 | 1.95906 | 17.5 | 27.98 | −107.44 |
| 45 | −53.865 | | 1 | | 28.69 | |

Aspherical surface data

Eleventh surface

K = 0.00000e+000   A4 = 1.68843e−006   A6 = 9.91646e−010   A8 = 1.10078e−012
A10 = −2.31698e−015   A12 = 6.11143e−018

Eighteenth surface

K = 0.00000e+000   A4 = 1.82776e−006   A6 = 1.47826e−009   A8 = 1.50300e−013
A10 = 6.97664e−016   A12 = −1.34096e−019

Twenty-third surface

K = 0.00000e+000   A4 = −6.58994e−007   A6 = −1.15131e−010   A8 = −1.56400e−013
A10 = 7.80020e−017   A12 = −6.35685e−020

Twenty-seventh surface

K = 0.00000e+000   A4 = −1.50246e−006   A6 = −1.51140e−010   A8 = 7.49039e−013
A10 = −2.30563e−015   A12 = 2.18183e−018

Various data
Zoom ratio 20.00

| | Wide angle | Intermediate | Telephoto |
|---|---|---|---|
| Focal length | 40.00 | 178.02 | 800.05 |
| F-number | 4.60 | 5.25 | 5.60 |

-continued

| Unit mm | | | |
|---|---|---|---|
| Half angle of field | 21.24 | 4.99 | 1.11 |
| Image height | 15.55 | 15.55 | 15.55 |
| Total lens length | 475.32 | 475.32 | 475.32 |
| BF | 55.03 | 55.03 | 55.03 |
| d10 | 18.27 | 106.53 | 153.32 |
| d18 | 163.49 | 66.43 | 1.50 |
| d24 | 35.85 | 25.22 | 37.45 |
| d29 | 5.47 | 24.89 | 30.82 |
| d30 | 2.50 | 2.50 | 2.50 |
| d36 | 7.21 | 13.83 | 21.97 |
| d42 | 17.68 | 11.06 | 2.92 |

| Variable focus adjustment interval Close range (3.5 m from surface of first lens unit closest to object side) | | | |
|---|---|---|---|
| D18 | 165.50 | 70.15 | 35.29 |
| D24 | 33.84 | 21.50 | 3.66 |
| Entrance pupil position | 142.03 | 598.93 | 2845.50 |
| Exit pupil position | −100.18 | −95.40 | −87.82 |
| Front principal point position | 171.72 | 566.27 | −835.27 |
| Rear principal point position | 15.03 | −122.99 | −745.02 |

| Zoom lens unit data | | | | | |
|---|---|---|---|---|---|
| Unit | First surface | Focal length | Lens structure length | Front principal point position | Rear principal point position |
| 1 | 1 | 230.00 | 73.91 | 31.30 | −20.67 |
| 2 | 11 | −34.11 | 26.79 | 5.09 | −18.41 |
| 3 | 19 | 125.00 | 12.39 | 0.39 | −7.98 |
| 4 | 25 | 94.10 | 15.81 | 0.51 | −9.87 |
| 5 | 30 | ∞ | 0.00 | 0.00 | 0.00 |
| 6 | 31 | −58.84 | 19.47 | 16.72 | 1.03 |
| 7 | 37 | −141.51 | 13.12 | −8.37 | −17.01 |
| 8 | 43 | 100.53 | 8.33 | 3.77 | −1.60 |

NUMERICAL EXAMPLE 7

| Unit mm | | | | | |
|---|---|---|---|---|---|
| Surface data | | | | | |
| Surface number | r | d | nd | vd | Effective diameter | Focal length |
| 1 | 239.608 | 2.50 | 1.85478 | 24.8 | 77.68 | −206.81 |
| 2 | 101.786 | 12.26 | 1.43875 | 94.9 | 74.93 | 161.48 |
| 3 | −226.395 | 0.15 | 1 | | 74.88 | |
| 4 | 98.567 | 6.29 | 1.43387 | 95.1 | 72.93 | 376.95 |
| 5 | 242.366 | 0.15 | 1 | | 72.19 | |
| 6 | 68.331 | 8.00 | 1.76385 | 48.5 | 69.43 | 132.39 |
| 7 | 197.977 | (Variable) | 1 | | 68.35 | |
| 8* | 984.248 | 1.10 | 2.00330 | 28.3 | 30.42 | −21.57 |
| 9 | 21.338 | 6.53 | 1 | | 25.11 | |
| 10 | −40.310 | 4.71 | 1.95906 | 17.5 | 24.77 | 32.79 |
| 11 | −18.821 | 0.85 | 1.88300 | 40.8 | 24.79 | −17.56 |
| 12 | 92.930 | 0.19 | 1 | | 24.37 | |
| 13 | 41.546 | 2.56 | 1.71736 | 29.5 | 24.50 | 100.96 |
| 14 | 93.913 | (Variable) | 1 | | 24.21 | |
| 15 | 146.392 | 7.85 | 1.53775 | 74.7 | 30.25 | 41.48 |
| 16 | −25.922 | 1.00 | 1.84666 | 23.8 | 30.79 | −80.33 |
| 17 | −42.376 | (Variable) | 1 | | 32.13 | |
| 18 | −254.024 | 4.30 | 1.53775 | 74.7 | 34.32 | 102.97 |
| 19 | −45.853 | 0.15 | 1 | | 34.55 | |
| 20 | 40.689 | 5.12 | 1.59349 | 67.0 | 33.13 | 64.24 |
| 21* | −611.952 | (Variable) | 1 | | 32.45 | |
| 22 (Stop) | ∞ | 2.29 | 1 | | 21.70 | |
| 23 | −43.093 | 0.80 | 1.88300 | 40.8 | 20.95 | −17.13 |
| 24 | 23.717 | 3.03 | 1.85478 | 24.8 | 20.43 | 41.43 |
| 25 | 66.287 | 2.73 | 1 | | 20.27 | |
| 26 | −30.190 | 0.70 | 1.88300 | 40.8 | 20.28 | −35.09 |
| 27 | −976.326 | 1.55 | 1 | | 21.15 | |
| 28 | −52.527 | 1.50 | 1.72916 | 54.7 | 21.50 | −46.02 |
| 29 | 95.187 | 5.32 | 1.85478 | 24.8 | 23.42 | 23.55 |

-continued

| | | Unit mm | | | | |
|---|---|---|---|---|---|---|
| 30 | −25.173 | 1.00 | 1 | | 24.19 | |
| 31 | 26.430 | 5.43 | 1.53775 | 74.7 | 27.45 | 60.97 |
| 32 | 124.911 | 0.10 | 1 | | 26.75 | |
| 33 | 37.728 | 5.65 | 1.53775 | 74.7 | 26.15 | 47.92 |
| 34 | −77.795 | 0.31 | 1 | | 25.04 | |
| 35 | 50.141 | 5.42 | 1.62041 | 60.3 | 22.35 | 28.28 |
| 36 | −26.024 | 0.90 | 1.80518 | 25.4 | 20.75 | −15.43 |
| 37 | 24.567 | 4.88 | 1 | | 18.01 | |
| 38 | −460.369 | 3.33 | 1.84666 | 23.8 | 16.75 | 30.17 |
| 39 | −24.507 | 0.70 | 1.88300 | 40.8 | 16.35 | −13.81 |
| 40 | 24.880 | 2.28 | 1 | | 15.73 | |
| 41 | 167.099 | 4.33 | 1.48749 | 70.2 | 25.77 | 62.74 |
| 42 | −37.274 | 0.10 | 1 | | 25.95 | |
| 43 | −114.674 | 0.95 | 2.00100 | 29.1 | 25.63 | −27.95 |
| 44 | 37.554 | 5.22 | 1.53775 | 74.7 | 25.72 | 49.99 |
| 45 | −90.986 | 0.15 | 1 | | 26.24 | |
| 46 | 139.879 | 4.98 | 1.48749 | 70.2 | 26.66 | 63.65 |
| 47 | −39.580 | 0.95 | 1.85478 | 24.8 | 26.86 | −151.15 |
| 48 | −57.457 | 0.20 | 1 | | 27.22 | |
| 49 | 50.127 | 4.00 | 1.50137 | 56.4 | 27.20 | 74.73 |
| 50 | −146.813 | 4.50 | 1 | | 26.91 | |
| 51 | | 33.00 | 1.60859 | 46.4 | 40.00 | |
| 52 | | 13.20 | 1.51633 | 64.1 | 40.00 | |
| 53 | | | 1 | | 40.00 | |

Aspherical surface data

Eighth surface

K = −4.41172e+003  A4 = 4.26158e−006  A6 = 3.79089e−007  A8 = −4.97228e−010
A10 = 7.91081e−012  A12 = 2.01053e−014
A5 = −2.00546e−006  A7 = −2.54263e−008  A9 = 6.85374e−011  A11 = −8.33665e−013

Twenty-first surface

K = −4.29923e+001  A4 = 1.03032e−006  A6 = −3.65553e−008  A8 = 3.24828e−010
A10 = −7.31549e−012  A12 = −7.53488e−015
A5 = 3.04736e−007  A7 = −1.41735e−009  A9 = 3.41917e−011  A11 = 4.05675e−013

Various data
Zoom ratio 21.50

| | Wide angle | Intermediate | Telephoto |
|---|---|---|---|
| Focal length | 15.80 | 73.26 | 339.72 |
| F-number | 3.60 | 3.60 | 4.61 |
| Half angle of field | 19.19 | 4.29 | 0.93 |
| Image height | 5.50 | 5.50 | 5.50 |
| Total lens length | 280.86 | 280.86 | 280.86 |
| BF | 6.98 | 6.98 | 6.98 |
| d 7 | 2.41 | 39.61 | 55.20 |
| d14 | 86.24 | 40.76 | 1.50 |
| d17 | 1.00 | 2.61 | 17.50 |
| d21 | 1.00 | 7.67 | 16.45 |

Variable focus adjustment interval Close range
(0.9 m from surface of first lens unit closest to object side)

| | | | |
|---|---|---|---|
| d14 | 86.74 | 43.25 | 18.50 |
| d17 | 0.50 | 0.13 | 0.50 |
| Entrance pupil position | 46.56 | 227.76 | 853.19 |
| Exit pupil position | −112.43 | −112.43 | −112.43 |
| Front principal point position | 60.27 | 256.07 | 226.38 |
| Rear principal point position | −8.82 | −66.28 | −332.74 |

Zoom lens unit data

| Unit | First surface | Focal length | Lens structure length | Front principal point position | Rear principal point position |
|---|---|---|---|---|---|
| 1 | 1 | 87.00 | 29.36 | 10.77 | −8.22 |
| 2 | 8 | −14.00 | 15.95 | 2.30 | −8.74 |
| 3 | 15 | 86.00 | 8.85 | 4.50 | −1.23 |
| 4 | 18 | 39.50 | 9.57 | 3.22 | −2.92 |

-continued

| | | Unit mm | | | |
|---|---|---|---|---|---|
| 5 | 22 | ∞ | 0.00 | 0.00 | 0.00 |
| 6 | 23 | −34.08 | 15.64 | −5.13 | −19.91 |
| 7 | 31 | 54,516.36 | 26.71 | −54,496.74 | −27,263.02 |
| 8 | 41 | 43.37 | 71.58 | 11.13 | −36.41 |

TABLE 1

| Conditional Expression No. | Physical quantity | Numerical Example | | | | | | |
|---|---|---|---|---|---|---|---|---|
| | | 1 | 2 | 3 | 4 | 5 | 6 | 7 |
| | fw | 7.90 | 7.90 | 7.80 | 10.00 | 6.50 | 40.00 | 15.80 |
| | ft | 169.86 | 169.87 | 132.60 | 300.01 | 176.07 | 800.05 | 339.72 |
| | φ | 11.00 | 11.00 | 11.00 | 11.00 | 11.00 | 31.10 | 11.00 |
| | f1 | 87.00 | 95.00 | 72.00 | 115.00 | 110.00 | 230.00 | 87.00 |
| | f2 | −14.00 | −14.68 | −13.13 | −18.00 | −26.89 | −34.11 | −14.00 |
| | f3 | 86.00 | 82.00 | 87.50 | 80.00 | 112.00 | 125.00 | 86.00 |
| | f4 | 39.50 | 36.00 | 40.70 | 68.00 | 72.00 | 94.10 | 39.50 |
| | f5 | 28.56 | 27.78 | 28.00 | 46.58 | 27.71 | −195.40 | 28.56 |
| | β2w_INF | −0.23 | −0.22 | −0.27 | −0.23 | −0.21 | −0.22 | −0.23 |
| | β2t_INF | −1.92 | −1.91 | −1.75 | −3.25 | −1.93 | −2.03 | −1.92 |
| | β3w_INF | −2.80 | −2.12 | −4.60 | −1.15 | −1.25 | −1.26 | −2.80 |
| | β3t_INF | 2.84 | 3.33 | 2.43 | −9.60 | 3.95 | 92.60 | 2.84 |
| | β3w_MOD | −2.79 | −2.11 | −4.65 | −1.13 | −1.23 | −1.25 | −2.79 |
| | β3t_MOD | 3.03 | 3.55 | 2.61 | −9.26 | 4.24 | 92.87 | 3.03 |
| | β4w_INF | 0.11 | 0.13 | 0.08 | 0.31 | 0.25 | 0.28 | 0.11 |
| | β4t_INF | −0.28 | −0.20 | −0.39 | 0.08 | −0.23 | −0.01 | −0.28 |
| | Z2 | 8.25 | 8.69 | 6.43 | 14.03 | 9.31 | 9.03 | 8.25 |
| | Z3 | −1.01 | −1.57 | −0.53 | 8.37 | −3.16 | −73.39 | −1.01 |
| | Z4 | −2.57 | −1.58 | −5.00 | 0.26 | −0.92 | −0.03 | −2.57 |
| | L34w | 1.00 | 1.41 | 1.12 | 5.19 | 19.32 | 35.85 | 1.00 |
| | L34t | 17.50 | 18.54 | 15.97 | 33.32 | 32.50 | 37.45 | 17.50 |
| | φ1p | 0.005 | 0.004 | 0.007 | 0.004 | 0.003 | 0.002 | 0.005 |
| | φ1n | −0.005 | −0.004 | −0.006 | −0.006 | −0.005 | −0.005 | −0.005 |
| | D | 29.99 | 30.00 | 31.98 | 39.99 | — | — | — |
| | EA | 24.19 | 23.60 | 23.86 | 26.24 | — | — | — |
| (2) | |f1/f3| | 1.01 | 1.16 | 0.82 | 1.44 | 0.98 | 1.84 | 1.01 |
| (3) | |f1/f2| | 6.21 | 6.47 | 5.48 | 6.39 | 4.09 | 6.74 | 6.21 |
| (4) | |f1/f4| | 2.20 | 2.64 | 1.77 | 1.69 | 1.53 | 2.44 | 2.20 |
| (5) | L34w/L34t | 0.06 | 0.08 | 0.07 | 0.16 | 0.59 | 0.96 | 0.06 |
| (7) | LNln(Z2)/ LNln(Z3 × Z4) | 2.20 | 2.39 | 1.92 | 3.48 | 2.09 | 2.89 | 2.20 |
| (8) | φ1p × f1 | 0.47 | 0.35 | 0.48 | 0.42 | 0.34 | 0.55 | 0.47 |
| (9) | φ1n × f1 | −0.42 | −0.38 | −0.44 | −0.69 | −0.57 | −1.18 | −0.42 |
| (10) | β5w | 1.27 | 1.41 | 1.12 | 1.07 | 0.91 | 2.17 | 2.54 |
| (11) | θ | 1.22 | 1.49 | 1.34 | 0.56 | — | — | — |
| (12) | D/EA | 1.24 | 1.27 | 1.34 | 1.52 | — | — | — |
| (13) | Zfw/φ | 21.50 | 21.50 | 17.00 | 30.00 | 27.09 | 20.00 | 21.50 |
| (14) | fw/φ | 0.72 | 0.72 | 0.71 | 0.91 | 0.59 | 1.29 | 1.44 |

According to the one embodiment of the present invention, it is possible to provide the zoom lens having the wide angle of field, the high zoom ratio, and the high optical performance over the entire zoom range, and being small in size and lightweight.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-264716, filed Dec. 26, 2014, which is hereby incorporated by reference herein in its entirety.

What is claimed is:

1. A zoom lens comprising
in order from an object side to an image side:
 a first lens unit having a positive refractive power;
 a second lens unit having a negative refractive power;
 a third lens unit having a positive refractive power;
 a fourth lens unit having a positive refractive power; and
 at least one rear lens unit,
wherein the first lens unit is configured not to move for zooming,
wherein the second lens unit, the third lens unit, and the fourth lens unit are configured to move while changing an interval between each pair of adjacent lens units thereof during zooming, and
wherein the third lens unit is configured to move from the object side toward the image side during focusing from an object at infinity to an object at close distance.

2. A zoom lens according to claim 1, wherein during zooming from a wide angle end to a telephoto end, the second lens unit is configured to move toward the image side, and the third lens unit and the fourth lens unit are configured to move so that an interval between the third lens unit and the fourth lens unit becomes larger at the telephoto end than at the wide angle end.

3. A zoom lens according to claim 1, wherein an imaging magnification of the third lens unit takes a value other than ±1 at all zoom positions and all focus positions.

4. A zoom lens according to claim 1, wherein the following conditional expression is satisfied:

$$0.40 < |f1/f3| < 3.00,$$

where f1 represents a focal length of the first lens unit, and f3 represents a focal length of the third lens unit.

5. A zoom lens according to claim 1, wherein the following conditional expression is satisfied:

$$2.00 < |f1/f2| < 8.00,$$

where f1 represents a focal length of the first lens unit, and f2 represents a focal length of the second lens unit.

6. A zoom lens according to claim 1, wherein the following conditional expression is satisfied:

$$0.80 < |f1/f4| < 4.00,$$

where f1 represents a focal length of the first lens unit, and f4 represents a focal length of the fourth lens unit.

7. A zoom lens according to claim 1, wherein the following conditional expression is satisfied:

$$0.01 < L34w/L34t < 0.99,$$

where L34w and L34t represent air intervals on an optical axis between the third lens unit and the fourth lens unit when focusing on the object at infinity at a wide angle end and a telephoto end, respectively.

8. A zoom lens according to claim 1, wherein the following conditional expression is satisfied:

$$1.50 < \ln(Z2)/\ln(Z3 \times Z4) < 4.50,$$

where Z2, Z3, and Z4 represent magnification-varying ratios of the second lens unit, the third lens unit, and the fourth lens unit when focusing on the object at infinity, respectively.

9. A zoom lens according to claim 1, wherein the following conditional expressions are satisfied:

$$0.10 < \phi1p \times f1 < 0.80; \text{ and}$$

$$-1.50 < \phi1n \times f1 < -0.10,$$

where f1 represents a focal length of the first lens unit, ($\phi1p$ represents an average power of positive lenses forming the first lens unit, and $\phi1n$ represents an average power of negative lenses forming the first lens unit.

10. A zoom lens according to claim 1, wherein the first lens unit includes one of four lenses and five lenses.

11. A zoom lens according to claim 1, wherein the following conditional expression is satisfied:

$$7.00 < Z,$$

where Z represents a zoom ratio of the zoom lens when focusing on the object at infinity.

12. A zoom lens according to claim 1, wherein the at least one rear lens unit comprises a fifth lens unit having a positive refractive power.

13. A zoom lens according to claim 12, wherein the following conditional expression is satisfied:

$$0.50 < \beta5w < 3.50,$$

where ($\beta5w$ represents an imaging magnification of the fifth lens unit at a wide angle end.

14. A zoom lens according to claim 12,
wherein the fifth lens unit includes a first sub lens unit having a positive refractive power and a second sub lens unit having a positive refractive power, which are separated by a largest air interval on an optical axis in the fifth lens unit, and a focal length conversion optical system configured to be removably insertable in an optical path between the first sub lens unit and the second sub lens unit, and
wherein the following conditional expression is satisfied:

$$-3.0° < \theta < +3.0°,$$

where θ represents an inclination of an on-axis light beam passing through the air interval between the first sub lens unit and the second sub lens unit with respect to the optical axis at a wide angle end.

15. A zoom lens according to claim 14, wherein the following conditional expression is satisfied:

$$0.50 < D/EA < 2.00,$$

where EA represents a light beam effective diameter at a last lens surface of the first sub lens unit, and D represents a length of an air interval on the optical axis between the first sub lens unit and the second sub lens unit.

16. A zoom lens according to claim 1, wherein the second lens unit is the most adjacent to the first lens unit at a wide angle end.

17. A zoom lens according to claim 1, further comprising an aperture stop,
wherein the aperture stop and lens units on an image side of the aperture stop are configured not to move for zooming.

18. A zoom lens according to claim 17,
wherein the at least one rear lens unit comprises a fifth lens unit having a positive refractive power, and
wherein the aperture stop is located between the fourth lens unit and the fifth lens unit.

19. An image pickup apparatus comprising:
a zoom lens; and
an image pickup element configured to receive light of a subject image formed by the zoom lens,
the zoom lens comprising in order from an object side to an image side:
a first lens unit having a positive refractive power;
a second lens unit having a negative refractive power;
a third lens unit having a positive refractive power;
a fourth lens unit having a positive refractive power; and
at least one rear lens unit,
wherein the first lens unit is configured not to move for zooming,
wherein the second lens unit, the third lens unit, and the fourth lens unit are configured to move while changing an interval between each pair of adjacent lens units thereof during zooming, and
wherein the third lens unit is configured to move from the object side toward the image side during focusing from an object at infinity to an object at close distance.

20. An image pickup apparatus according to claim 19, wherein the following conditional expression is satisfied:

$$0.45 < fw/\phi,$$

where fw represents a focal length of the zoom lens at a wide angle end, and φ represents a diagonal length of an image size of the image pickup element.

* * * * *